United States Patent
Busacca et al.

(10) Patent No.: US 12,506,230 B2
(45) Date of Patent: Dec. 23, 2025

(54) REINFORCEMENT FOR ELECTRICAL INTERCONNECT SYSTEMS OF ELECTROCHEMICAL BATTERIES AND SYSTEMS AND METHODS THEREFOR

(71) Applicant: Enovix Corporation, Fremont, CA (US)

(72) Inventors: Robert S. Busacca, Oakland, CA (US); Aditya Mandalam, San Jose, CA (US); Miles A. M. Kool, San Francisco, CA (US); Robert K. Rosen, Lincoln, CA (US); Bruno A. Valdes, Sunnyvale, CA (US); Robert F. Kinchen, Fremont, CA (US)

(73) Assignee: Enovix Corporation, Fremont, CA (US)

(*) Notice: Subject to any disclaimer, the term of this patent is extended or adjusted under 35 U.S.C. 154(b) by 0 days.

(21) Appl. No.: 17/705,500

(22) Filed: Mar. 28, 2022

(65) Prior Publication Data
US 2022/0320694 A1    Oct. 6, 2022

Related U.S. Application Data

(60) Provisional application No. 63/168,395, filed on Mar. 31, 2021.

(51) Int. Cl.
*H01M 50/54*      (2021.01)
*H01M 50/103*    (2021.01)
(Continued)

(52) U.S. Cl.
CPC ......... *H01M 50/54* (2021.01); *H01M 50/103* (2021.01); *H01M 50/14* (2021.01);
(Continued)

(58) Field of Classification Search
CPC .... H01M 50/54; H01M 50/103; H01M 50/14; H01M 50/474; H01M 50/486;
(Continued)

(56) References Cited

U.S. PATENT DOCUMENTS 4,396,689 A      8/1983   Grimes
5,456,813 A  *  10/1995  Grange-Cossou .. H01M 50/536
                                                          204/288.2
(Continued)

FOREIGN PATENT DOCUMENTS

EP        1270765 B1    1/2007
EP        2858162 A1    4/2015
(Continued)

OTHER PUBLICATIONS

Mathieu, Olivier; "Insulation Materials for Laminated Busbars—A discussion on flexible and rigid insulation films and their parameters (Interview with Sebastiaan De Boodt", Rogers Corporation, Nov. 1, 2019 <https://rogerscorp.com/blog/2019/insulation-materials-for-laminated-busbars>. (Year: 2019).*

(Continued)

*Primary Examiner* — Jessie Walls-Murray
(74) *Attorney, Agent, or Firm* — Haley Guiliano LLP; Ronit Buller

(57) ABSTRACT

A secondary battery assembly includes an electrode assembly having mutually perpendicular transverse, longitudinal, and vertical axes corresponding to the X, Y and Z axes, respectively, of a three-dimensional Cartesian coordinate system. The electrode assembly defines a population of faces, each face defined by two of the transverse, longitudinal, and vertical axes. The secondary battery assembly also includes a population of first current collector tabs electrically coupled to a first bus bar extending along a first face of the electrode assembly, the first face extending in at (Continued)

least one of a Z-X plane defined by the Z and X axes or a Z-Y plane defined by the Z and Y axes. The second battery assembly also includes a reinforcement structure disposed over at least a portion of the first current collector tabs, the first current collector tabs extending along the first face. The reinforcement structure includes a polymer.

31 Claims, 12 Drawing Sheets

(51) Int. Cl.
  *H01M 50/14* (2021.01)
  *H01M 50/474* (2021.01)
  *H01M 50/486* (2021.01)
  *H01M 50/507* (2021.01)
  *H01M 50/533* (2021.01)
  *H01M 50/586* (2021.01)
  *H01M 50/593* (2021.01)

(52) U.S. Cl.
  CPC ....... *H01M 50/474* (2021.01); *H01M 50/486* (2021.01); *H01M 50/507* (2021.01); *H01M 50/533* (2021.01); *H01M 50/586* (2021.01); *H01M 50/593* (2021.01)

(58) Field of Classification Search
  CPC ............. H01M 50/507; H01M 50/533; H01M 50/586; H01M 50/593; H01M 50/505; H01M 50/209; H01M 10/0585
  See application file for complete search history.

(56) References Cited

U.S. PATENT DOCUMENTS

| | | | |
|---|---|---|---|
| 6,096,456 A | 8/2000 | Takeuchi | |
| 6,159,633 A * | 12/2000 | Yang | H01M 10/6567 429/211 |
| 6,383,234 B1 | 5/2002 | Noh | |
| 7,722,984 B2 | 5/2010 | Kim | |
| 8,865,345 B1 | 10/2014 | Ramasubramanian | |
| 9,660,230 B2 | 5/2017 | Noh | |
| 9,660,292 B2 | 5/2017 | Rust, III | |
| 10,158,108 B2 | 12/2018 | Narita | |
| 11,264,680 B2 | 3/2022 | Busacca | |
| 2005/0089751 A1* | 4/2005 | Oogami | H01M 50/507 429/162 |
| 2005/0106453 A1* | 5/2005 | Yamauchi | H01M 50/169 29/623.2 |
| 2010/0035144 A1* | 2/2010 | Oh | H01M 50/557 429/211 |
| 2011/0076521 A1* | 3/2011 | Shimizu | H01M 50/529 429/82 |
| 2011/0159328 A1 | 6/2011 | Yeo | |
| 2012/0121966 A1* | 5/2012 | Kim | H01M 50/512 429/158 |
| 2013/0164585 A1* | 6/2013 | Kwak | H01M 50/262 429/96 |
| 2015/0162589 A1 | 6/2015 | Kesper | |
| 2015/0270666 A1* | 9/2015 | Callicoat | H01R 43/00 439/627 |
| 2016/0049630 A1* | 2/2016 | Fuhr | H01M 50/507 429/121 |
| 2016/0111701 A1 | 4/2016 | Schumann | |
| 2018/0108891 A1* | 4/2018 | Fees | B60K 1/04 |
| 2018/0261806 A1 | 9/2018 | Kawate et al. | |
| 2018/0261992 A1* | 9/2018 | Bower | H01M 50/512 |
| 2018/0301667 A1* | 10/2018 | Nakai | H01M 50/566 |
| 2018/0309110 A1* | 10/2018 | Iwasaki | H01M 50/557 |
| 2020/0212493 A1 | 7/2020 | Busacca et al. | |
| 2020/0335747 A1* | 10/2020 | Koshiol | H01M 50/553 |
| 2020/0350633 A1 | 11/2020 | Busacca | |
| 2021/0043881 A1 | 2/2021 | Wang | |
| 2021/0234223 A1* | 7/2021 | Taniuchi | H01M 10/6551 |
| 2021/0288366 A1* | 9/2021 | Brenner | H01M 50/367 |
| 2022/0069421 A1 | 3/2022 | Dalton | |
| 2022/0115711 A1 | 4/2022 | Busacca | |
| 2022/0181727 A1* | 6/2022 | Park | H01M 50/183 |
| 2022/0320639 A1 | 10/2022 | Busacca | |
| 2022/0320694 A1 | 10/2022 | Busacca | |

FOREIGN PATENT DOCUMENTS

| | | |
|---|---|---|
| EP | 2223367 B1 | 6/2015 |
| EP | 3367468 A1 | 8/2018 |
| EP | 3709392 A1 | 9/2020 |
| EP | 4002536 A1 | 5/2022 |
| EP | 4002537 A1 | 5/2022 |
| JP | 2005347195 A | 12/2005 |
| JP | 2008016193 A | 1/2008 |
| JP | 2016085976 A | 5/2016 |
| KR | 102102101 B1 | 4/2020 |
| WO | 2013112135 A1 | 8/2013 |
| WO | 2018020906 A1 | 2/2018 |
| WO | 2019089492 A1 | 5/2019 |
| WO | 2020066254 A1 | 4/2020 |
| WO | 2022108954 A1 | 5/2022 |
| WO | 2022109019 A1 | 5/2022 |
| WO | 2022221056 A2 | 10/2022 |

OTHER PUBLICATIONS

ThermalPress, "Why Use Heat Staking for Plastic Assembly Projects?", <https://www.thermalpress.com/why-use-heat-staking-for-plastic-assembly/> (Year: 2020).*
International Search Report and Written Opinion issued for PCT/US2022/022087 dated Jul. 26, 2022 (15 pages).
International Search Report and Written Opinion issued for PCT/US2022/022176 dated Sep. 12, 2022 (15 pages).
International Search Report and Written Opinion issued for PCT/US2022/033222 dated Oct. 7, 2022 (15 pages).
Extended European Search Report issued for EP 21208848.8 dated Apr. 22, 2022 (8 pages).
Extended European Search Report issued for EP 21208850.4 dated Apr. 20, 2022 (8 pages).

* cited by examiner

REINFORCEMENT FOR ELECTRICAL INTERCONNECT SYSTEMS OF ELECTROCHEMICAL BATTERIES AND SYSTEMS AND METHODS THEREFOR

CROSS-REFERENCE TO RELATED APPLICATION

This application claims priority to U.S. Provisional Patent Application No. 63/168,395, filed Mar. 31, 2021, which is hereby incorporated by reference in its entirety.

FIELD

The field of the disclosure relates generally to energy storage technology, such as battery technology. More specifically, the field of the disclosure relates to reinforcement films or layers for electrical interconnections of battery components, such as components of electrochemical batteries, e.g., lithium based secondary batteries.

BACKGROUND

Lithium based secondary batteries have become desirable energy sources due to their comparatively high energy density, power and shelf life. Examples of lithium secondary batteries include non-aqueous batteries such as lithium-ion and lithium-polymer batteries.

Known energy storage devices, such as batteries, fuel cells and electrochemical capacitors, typically have two-dimensional laminar architectures, such as planar or spirally wound (i.e., jellyroll) laminate structures, where a surface area of each laminate is approximately equal to its geometric footprint (ignoring porosity and surface roughness).

Three-dimensional secondary batteries may provide increased capacity and longevity compared to laminar secondary batteries. The production of such three-dimensional secondary batteries, however, presents manufacturing and cost challenges.

During the manufacturing process of stacked cell type secondary batteries, interconnection tabs may be welded or folded along one or more edges of the battery that are susceptible to damage due to impacts or material fatigue. Failure of such interconnections may cause deteriorated performance or failure of the battery. Thus, it would be desirable to produce batteries while addressing the issues in the known art.

BRIEF DESCRIPTION

In one embodiment, an electrode assembly for cycling between a charged state and a discharged state includes a population of unit cells, an electrode bus bar, and a counter-electrode bus bar, wherein the members of the unit cell population comprise an electrode structure, a separator structure, and a counter-electrode structure, wherein (a) the electrode structures comprise an electrode active material layer, an electrode current collector having a tab, and an electrode tab reinforcement structure comprising a first polymer disposed over at least a portion of the electrode current collector tab, and (b) the counter-electrode current collectors comprise a counter-electrode active material layer, a counter-electrode current collector having a tab, and a counter-electrode tab reinforcement structure comprising a second polymer disposed over at least a portion of the counter-electrode current collector tab, and the electrode structures are electrically connected, in parallel, to the electrode bus bar via the electrode current collector tabs and the counter-electrode structures are electrically connected, in parallel, to the counter-electrode bus bar via the counter-electrode current collector tabs.

In another embodiment, a secondary battery assembly includes an electrode assembly having mutually perpendicular transverse, longitudinal, and vertical axes corresponding to the X, Y and Z axes, respectively, of a three-dimensional Cartesian coordinate system, the electrode assembly defining a population of faces, each face defined by two of the transverse, longitudinal, and vertical axes; a population of first current collector tabs electrically coupled to a first bus bar extending along a first face of the electrode assembly, the first face extending in at least one of a Z-X plane defined by the Z and X axes or a Z-Y plane defined by the Z and Y axes; and a reinforcement structure disposed over at least a portion of the first current collector tabs, the first current collector tabs extending along the first face, the reinforcement structure comprising a polymer.

In another embodiment, a secondary battery includes an electrode assembly having mutually perpendicular transverse, longitudinal, and vertical axes corresponding to the X, Y and Z axes, respectively, of a three-dimensional Cartesian coordinate system, the electrode assembly defining a population of faces, each face defined by two of the transverse, longitudinal, and vertical axes; a population of first current collector tabs electrically coupled to a first bus bar extending along a first face of the electrode assembly, the first face extending in one of a Z-X plane defined by the Z and X axes or a Z-Y plane defined by the Z and Y axes; a reinforcement structure disposed over at least a portion of the first current collector tabs, the first current collector tabs extending along the first face, the reinforcement structure comprising a polymer; and a battery enclosure enclosing the electrode assembly and the reinforcement structure.

In yet another embodiment, a method of preparing a battery assembly for use with a secondary battery includes preparing an electrode assembly having mutually perpendicular transverse, longitudinal, and vertical axes corresponding to the X, Y and Z axes, respectively, of a three-dimensional Cartesian coordinate system, the electrode assembly defining a population of faces, each face defined by two of the transverse, longitudinal, and vertical axes; electrically coupling a population of first current collector tabs to a first bus bar extending along a first face of the electrode assembly; adhering a reinforcement structure over at least a portion of the first current collector tabs, the reinforcement structure comprising a polymer; and enclosing the electrode assembly and the reinforcement structure within a battery enclosure.

In yet another embodiment, a method of manufacturing a secondary battery includes preparing an electrode assembly having mutually perpendicular transverse, longitudinal, and vertical axes corresponding to the X, Y and Z axes, respectively, of a three-dimensional Cartesian coordinate system, the electrode assembly defining a population of faces, each face defined by two of the transverse, longitudinal, and vertical axes; electrically coupling a population of first current collector tabs to a first bus bar extending along a first face of the electrode assembly; adhering a reinforcement structure over at least a portion of the first current collector tabs, the reinforcement structure comprising a polymer; enclosing the electrode assembly and the reinforcement structure within a battery enclosure, such that the reinforcement structure is between the battery enclosure and the electrode assembly; and vacuum sealing the enclosure.

DEFINITIONS

Figure 1:
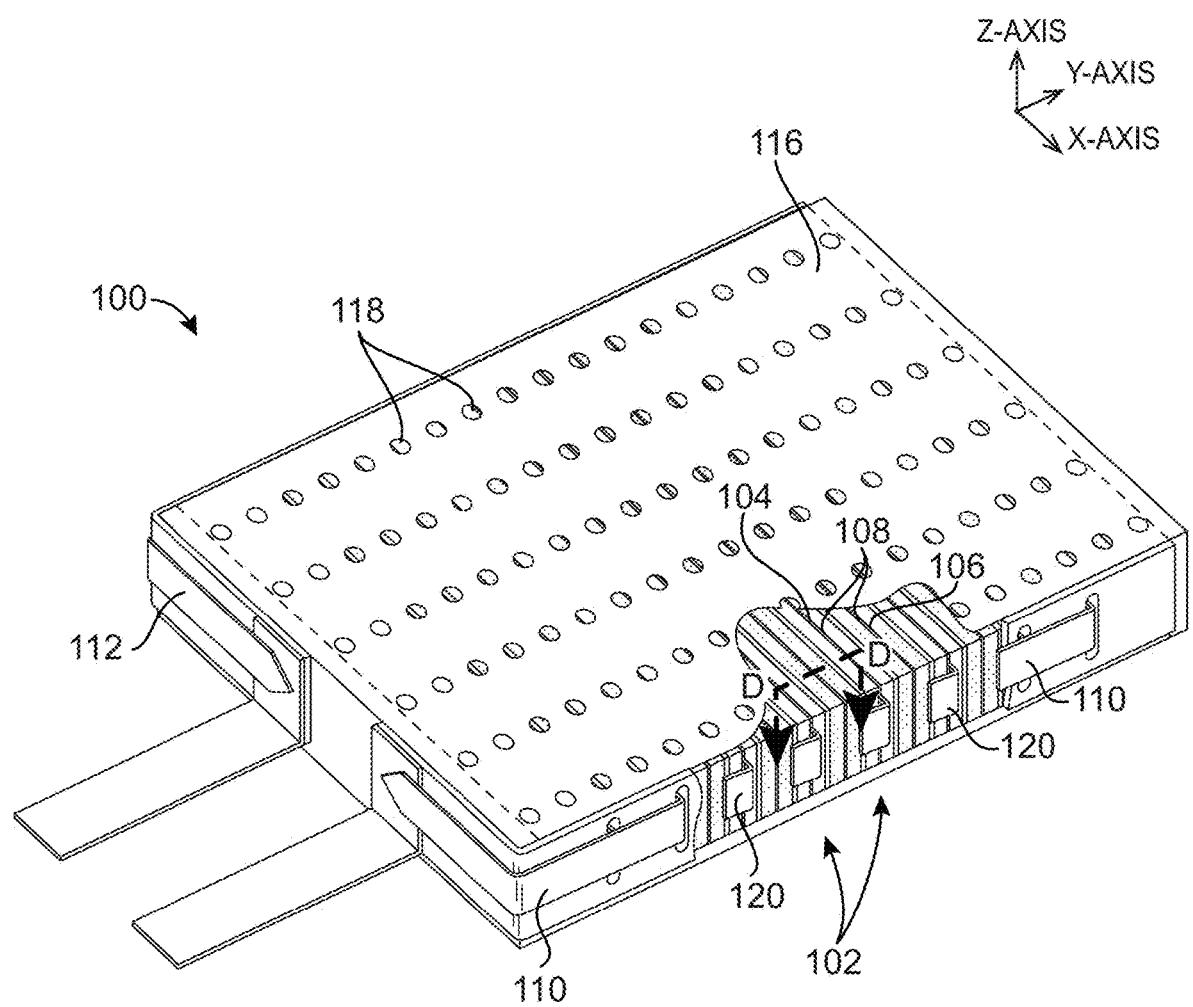
FIG. 1 is front perspective view of one suitable embodiment of a battery assembly having a cutaway portion, prior to application of a reinforcement structure according to the present disclosure.

"A," "an," and "the" (i.e., singular forms) as used herein refer to plural referents unless the context clearly dictates otherwise. For example, in one instance, reference to "an electrode" includes both a single electrode and a plurality of similar electrodes.

"About" and "approximately" as used herein refers to plus or minus 10%, 5%, or 1% of the value stated. For example, in one instance, about 250 μm would include 225 μm to 275 μm. By way of further example, in one instance, about 1,000 μm would include 900 μm to 1,100 μm. Unless otherwise indicated, all numbers expressing quantities (e.g., measurements, and the like) and so forth used in the specification and claims are to be understood as being modified in all instances by the term "about." Accordingly, unless indicated to the contrary, the numerical parameters set forth in the following specification and attached claims are approximations. Each numerical parameter should at least be construed in light of the number of reported significant digits and by applying ordinary rounding techniques.

"Anode" as used herein in the context of a secondary battery refers to the negative electrode in a secondary battery.

"Anode material" or "Anodically active" as used herein means material suitable for use as the negative electrode of a secondary battery.

"Cathode" as used herein in the context of a secondary battery refers to the positive electrode in a secondary battery.

"Cathode material" or "Cathodically active" as used herein means material suitable for use as the positive electrode of a secondary battery.

"Conversion chemistry active material" or "Conversion chemistry material" refers to a material that undergoes a chemical reaction during the charging and discharging cycles of a secondary battery.

"Counter electrode" as used herein may refer to the negative or positive electrode (anode or cathode), opposite of the Electrode, of a secondary battery unless the context clearly indicates otherwise.

"Cycle" as used herein in the context of cycling of a secondary battery between charged and discharged states refers to charging and/or discharging a battery to move the battery in a cycle from a first state that is either a charged or discharged state, to a second state that is the opposite of the first state (i.e., a charged state if the first state was discharged, or a discharged state if the first state was charged), and then moving the battery back to the first state to complete the cycle. For example, a single cycle of the secondary battery between charged and discharged states can include, as in a charge cycle, charging the battery from a discharged state to a charged state, and then discharging back to the discharged state, to complete the cycle. The single cycle can also include, as in a discharge cycle, discharging the battery from the charged state to the discharged state, and then charging back to a charged state, to complete the cycle.

"Electrochemically active material" as used herein means anodically active or cathodically active material.

"Electrode" as used herein may refer to the negative or positive electrode (anode or cathode) of a secondary battery unless the context clearly indicates otherwise.

"Electrode current collector layer" as used herein may refer to an anode (e.g., negative) current collector layer or a cathode (e.g., positive) current collector layer.

"Electrode material" as used herein may refer to anode material or cathode material unless the context clearly indicates otherwise.

"Electrode structure" as used herein may refer to an anode structure (e.g., negative electrode structure) or a cathode structure (e.g., positive electrode structure) adapted for use in a battery unless the context clearly indicates otherwise.

"Longitudinal axis," "transverse axis," and "vertical axis," as used herein refer to mutually perpendicular axes (i.e., each are orthogonal to one another). For example, the "longitudinal axis," "transverse axis," and the "vertical axis" as used herein are akin to a Cartesian coordinate system used to define three-dimensional aspects or orientations. As such, the descriptions of elements of the disclosed subject matter herein are not limited to the particular axis or axes used to describe three-dimensional orientations of the elements. Alternatively stated, the axes may be interchangeable when referring to three-dimensional aspects of the disclosed subject matter. "Weakened region" refers to a portion of the web that has undergone a processing operation such as scoring, cutting, perforation or the like such that the local rupture strength of the weakened region is lower than the rupture strength of a non-weakened region.

DETAILED DESCRIPTION

Embodiments of the present disclosure relate to reinforcement structures for components for batteries, such as secondary batteries, for reducing the occurrences of damage to the components to maintain the functionality, safety and/or output of the battery.

Figure 2:
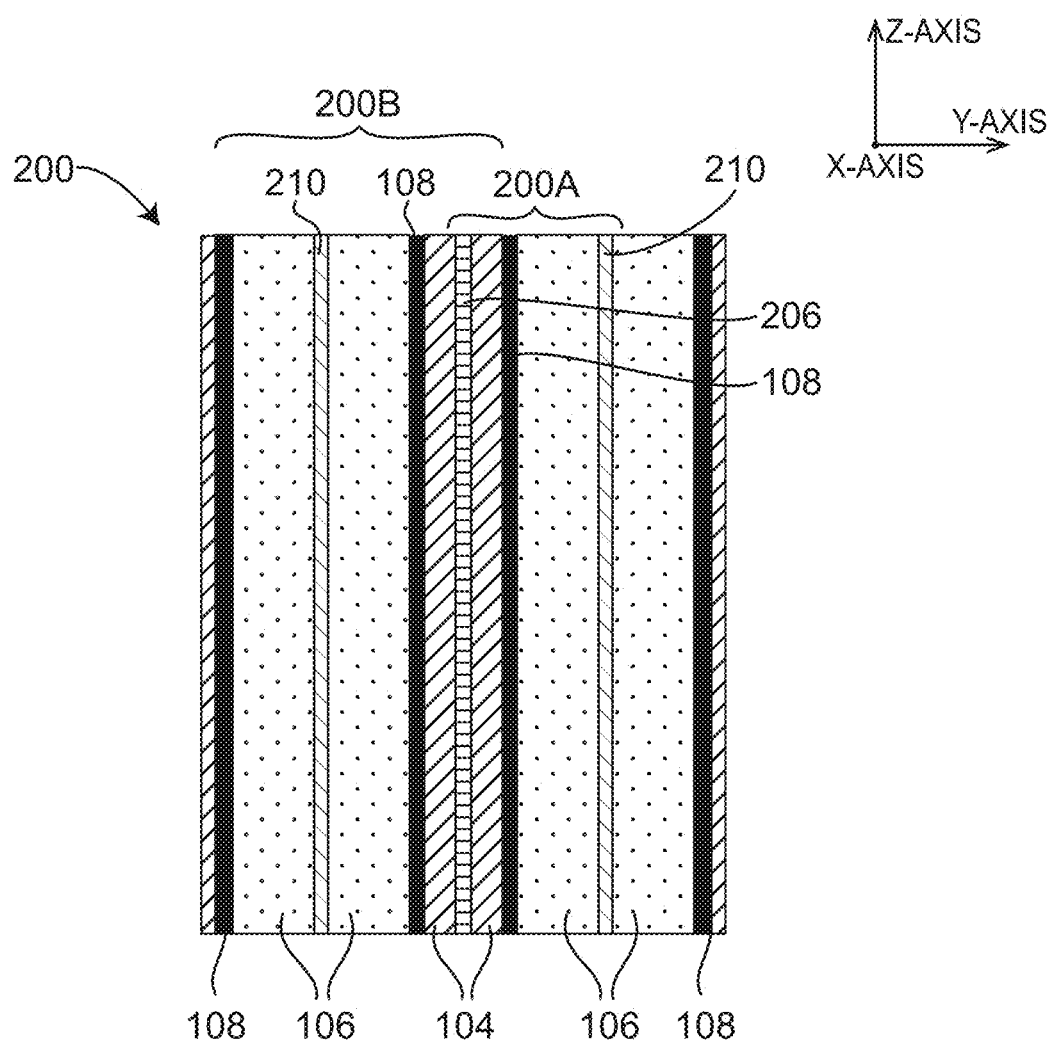
FIG. 2 is section view taken from section line D-D of an electrode assembly of FIG. 1.

One suitable embodiment of a battery assembly 100, prior to application of a reinforcement structure, is described with reference to FIG. 1. As illustrated in FIG. 1, the battery assembly 100 includes a population of adjacent electrode sub-units 102. Each electrode sub-unit 102 has a dimension in the X-axis, Y-axis and Z-axis, respectively. The X, Y and Z-axes are each mutually perpendicular, akin to a Cartesian coordinate system. As used herein, dimensions of each electrode sub-unit 102 in the Z-axis may be referred to as a "height", dimensions in the X-axis may be referred to as a "length" and dimensions in the Y-axis may be referred to as a "width." Electrode sub-units may be combined into one or more unit cells 200 (FIG. 2). Each unit cell 200 comprises at least one anodically active material layer 104 and at least one cathodically active material layer 106. The anodically active material layer 104 and cathodically active material layer 106 are electrically isolated from each other by a separator layer 108. It should be appreciated that in suitable embodiments of the present disclosure, any number of electrode sub-units 102 may be used, such as from 1 to 200 or more sub-units in a single battery assembly 100.

With reference still to FIG. 1, the battery assembly 100 includes bus bars 110 and 112 that are in electrical contact with an anodically active layer 104 and a cathodically active layer 106 of each electrode sub-unit 102, respectively, via an electrode tab (or current collector tab) 120. Accordingly, the bus bar 110 seen in FIG. 1 may be referred to as an anode bus bar and the bus bar 112 may be referred to as a cathode bus bar. In one embodiment, a casing 116, which may be referred to as a constraint, may be applied over one or both of the X-Y surfaces of the battery assembly 100. In the embodiment shown in FIG. 1, the casing 116 includes a population of perforations 118 to facilitate distribution or flow of an electrolyte solution, once the battery assembly 100 has been fully assembled.

In one embodiment, each of the anodically active layer 104 and the cathodically active layer 106 may be a multi-layer material including, for example, an electrode current collector layer (i.e., an anode current collector layer or a cathode current collector layer), and an electrochemically active material layer (i.e., a layer of anodically active material or a layer of cathodically active material) on at least one major surface thereof, and in other embodiments one or more of the anodically active layer and the cathodically active layer may be a single layer of appropriate material.

With reference to FIG. 2, individual layers of the unit cell 200, which may be the same as or similar to electrode sub-units 102, are shown. For each of the unit cells 200, in some embodiments, the separator layer 108 is an ionically permeable polymeric woven material suitable for use as a separator in a secondary battery. A cross sectional view of one embodiment of a unit cell 200 is shown in FIG. 2. In this embodiment, the electrode unit cell 200 comprises anode current collector layer 206 in the center, anodically active material layer 104, separator 108, cathodically active material layer 106 and cathode current collector layer 210 in a stacked formation. In an alternative embodiment, the placement of the cathodically active material layer 106 and the anodically active material layer 104 may be swapped, such that the cathodically active material layer(s) 106 are toward the center and the anodically active material layer(s) are distal to the cathodically active material layers 106. In one embodiment, a unit cell 200A includes a cathode current collector 210, a cathodically active material layer 106, a separator 108, an anodically active material layer 104 and an anode current collector 206 in stacked succession, from right to left in the illustration of FIG. 2. In an alternative embodiment, a unit cell 200B includes a separator 108, a first layer of cathodically active material layer 106, cathode current collector 210, a second layer of cathodically active material layer 106, a separator 108, a first layer of anodically active material layer 104, anode current collector 206, a second layer of anodically active material layer 104 and a separator 108, in stacked succession, from left to right in the illustration of FIG. 2.

In one embodiment, the anode current collector layer 206 may comprise a conductive metal such as copper, copper alloys, carbon, nickel, stainless steel or any other material suitable as an anode current collector layer. The anodically active material layer 104 may be formed as a first layer on a first surface of the anode current collector layer 206 and a second layer on a second opposing surface of the anode current collector layer 206. In another embodiment, the anode current collector layer 206 and anodically active material layer 104 may be intermixed. The first surface and the second opposing surface may be referred to as major surfaces, or front and back surfaces, of the layer. A major surface, as used herein, refers to the surfaces defined by the plane formed by the length of the material in X-Axis direction (not shown in FIG. 2) and the height of the material in the Z-Axis direction.

In one embodiment, the anodically active material layer(s) 104 may each have a thickness of at least about 10 µm. For example, in one embodiment, the anodically active material layer(s) 104 will (each) have a width in the Y-axis direction of at least about 40 µm. By way of further example, in one such embodiment, the anodically active material layer(s) 104 will (each) have a width of at least about 80 µm. By way of further example, in one such embodiment, the anodically active material layers 104 will each have a width of at least about 120 µm. Typically, however, the anodically active material layers 104 will each have a width of less than about 60 µm or even less than about 30 µm. As used herein, the term thickness and width may be used interchangeably to denote a measurement in the Y-axis direction.

In general, the negative electrode active material (e.g., anodically active material) may be selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide, $ZnCo_2O_4$; (f) particles of graphite and carbon; (g) lithium metal, and (h) combinations thereof.

Exemplary anodically active materials include carbon materials such as graphite and soft or hard carbons, or graphene (e.g., single-walled or multi-walled carbon nanotubes), or any of a range of metals, semi-metals, alloys, oxides, nitrides and compounds capable of intercalating lithium or forming an alloy with lithium. Specific examples of the metals or semi-metals capable of constituting the anode material include graphite, tin, lead, magnesium, aluminum, boron, gallium, silicon, Si/C composites, Si/graphite blends, silicon oxide (SiOx), porous Si, intermetallic Si alloys, indium, zirconium, germanium, bismuth, cadmium, antimony, silver, zinc, arsenic, hafnium, yttrium, lithium, sodium, graphite, carbon, lithium titanate, palladium, and mixtures thereof. In one exemplary embodiment, the anodically active material comprises aluminum, tin, or silicon, or an oxide thereof, a nitride thereof, a fluoride thereof, or other alloy thereof. In another exemplary embodiment, the anodically active material comprises silicon or an alloy or oxide thereof.

In one embodiment, the anodically active material is microstructured to provide a significant void volume fraction to accommodate volume expansion and contraction as lithium ions (or other carrier ions) are incorporated into or leave the negative electrode active material during charging and discharging processes. In general, the void volume fraction of each of the anodically active material layer(s) 104 is at least 0.1. Typically, however, the void volume fraction of each of the anodically active material layer(s) is not greater than 0.8. For example, in one embodiment, the void volume fraction of each of the anodically active material layer(s) 104 is about 0.15 to about 0.75. By way of the further example, in one embodiment, the void volume fraction of (each of) the anodically active material layer(s) 104 is about 0.2 to about 0.7. By way of the further example, in one embodiment, the void volume fraction of each of the anodically active material layer(s) 104 is about 0.25 to about 0.6.

Depending upon the composition of the microstructured anodically active material and the method of its formation, the microstructured anodically active material may comprise macroporous, microporous, or mesoporous material layers or a combination thereof, such as a combination of microporous and mesoporous, or a combination of mesoporous and macroporous. Microporous material is typically characterized by a pore dimension of less than 10 nm, a wall dimension of less than 10 nm, a pore depth of 1-50 micrometers, and a pore morphology that is generally characterized by a "spongy" and irregular appearance, walls that are not smooth, and branched pores. Mesoporous material is typically characterized by a pore dimension of 10-50 nm, a wall dimension of 10-50 nm, a pore depth of 1-100 micrometers, and a pore morphology that is generally characterized by branched pores that are somewhat well defined or dendritic pores. Macroporous material is typically characterized by a pore dimension of greater than 50 nm, a wall dimension of greater than 50 nm, a pore depth of 1-500 micrometers, and a pore morphology that may be varied, straight, branched, or dendritic, and smooth or rough-walled. Additionally, the void volume may comprise open or closed voids, or a combination thereof. In one embodiment, the void volume comprises open voids, that is, the negative electrode active material contains voids having openings at the lateral surface of the negative electrode active material through which lithium ions (or other carrier ions) can enter or leave the anodically active material; for example, lithium ions may enter the anodically active material through the void openings after leaving the cathodically active material. In another embodiment, the void volume comprises closed voids, that is, the anodically active material contains voids that are enclosed by anodically active material. In general, open voids can provide greater interfacial surface area for the carrier ions whereas closed voids tend to be less susceptible to solid electrolyte interface while each provides room for expansion of the anodically active material upon the entry of carrier ions. In certain embodiments, therefore, it is preferred that the anodically active material comprise a combination of open and closed voids.

In one embodiment, the anodically active material comprises porous aluminum, tin or silicon or an alloy, an oxide, or a nitride thereof. Porous silicon layers may be formed, for example, by anodization, by etching (e.g., by depositing precious metals such as gold, platinum, silver or gold/palladium on the surface of single crystal silicon and etching the surface with a mixture of hydrofluoric acid and hydrogen peroxide), or by other methods known in the art such as patterned chemical etching. Additionally, the porous anodically active material will generally have a porosity fraction of at least about 0.1, but less than 0.8 and have a thickness of about 1 to about 100 micrometers. For example, in one embodiment, the anodically active material comprises porous silicon, has a thickness of about 5 to about 100 micrometers, and has a porosity fraction of about 0.15 to about 0.75. By way of further example, in one embodiment, the anodically active material comprises porous silicon, has a thickness of about 10 to about 80 micrometers, and has a porosity fraction of about 0.15 to about 0.7. By way of further example, in one such embodiment, the anodically active material comprises porous silicon, has a thickness of about 20 to about 50 micrometers, and has a porosity fraction of about 0.25 to about 0.6. By way of further example, in one embodiment, the anodically active material comprises a porous silicon alloy (such as nickel silicide), has a thickness of about 5 to about 100 micrometers, and has a porosity fraction of about 0.15 to about 0.75.

In another embodiment, the anodically active material comprises fibers of aluminum, tin or silicon, or an alloy thereof. Individual fibers may have a diameter (thickness dimension) of about 5 nm to about 10,000 nm and a length generally corresponding to the thickness of the anodically active material. Fibers (nanowires) of silicon may be formed, for example, by chemical vapor deposition or other techniques known in the art such as vapor liquid solid (VLS) growth and solid liquid solid (SLS) growth. Additionally, the anodically active material will generally have a porosity fraction of at least about 0.1, but less than 0.8 and have a thickness of about 1 to about 200 micrometers. For example, in one embodiment, the anodically active material comprises silicon nanowires, has a thickness of about 5 to about 100 micrometers, and has a porosity fraction of about 0.15 to about 0.75. By way of further example, in one embodiment, the anodically active material comprises silicon nanowires, has a thickness of about 10 to about 80 micrometers, and has a porosity fraction of about 0.15 to about 0.7. By way of further example, in one such embodiment, the anodically active material comprises silicon nanowires, has a thickness of about 20 to about 50 micrometers, and has a porosity fraction of about 0.25 to about 0.6. By way of further example, in one embodiment, the anodically active material comprises nanowires of a silicon alloy (such as nickel silicide), has a thickness of about 5 to about 100 micrometers, and has a porosity fraction of about 0.15 to about 0.75.

In yet other embodiments, the negative electrode (i.e., the electrode or the counter-electrode depending on context) or anodically active material layer 104 is coated with a particulate lithium material selected from the group consisting of stabilized lithium metal particles, e.g., lithium carbonate-stabilized lithium metal powder, lithium silicate stabilized lithium metal powder, or other source of stabilized lithium metal powder or ink. The particulate lithium material may be applied on the anodically active material layer 104 (e.g., negative electrode) by spraying, loading or otherwise disposing the lithium particulate material onto the negative electrode active material layer at a loading amount of about 0.05 to 5 mg/cm$^2$, e.g., about 0.1 to 4 mg/cm$^2$, or even about 0.5 to 3 mg/cm². The average particle size ($D_{50}$) of the lithium particulate material may be 5 to 200 µm, e.g., about 10 to 100 µm, 20 to 80 µm, or even about 30 to 50 µm. The average particle size ($D_{50}$) may be defined as a particle size corresponding to 50% in a cumulative volume-based particle size distribution curve. The average particle size ($D_{50}$) may be measured, for example, using a laser diffraction method.

In general, the anode current collector 206 will have an electrical conductivity of at least about $10^3$ Siemens/cm. For example, in one such embodiment, the anode current collector will have a conductivity of at least about $10^4$ Siemens/cm. By way of further example, in one such embodiment, the anode current collector will have a conductivity of at least about $10^5$ Siemens/cm. Exemplary electrically conductive materials suitable for use as anode current collectors 206 include metals, such as, copper, nickel, stainless steel, carbon, cobalt, titanium, and tungsten, and alloys thereof.

Referring again to FIG. 2, in another suitable embodiment, the unit cell 200 includes one or more cathode current collector layer 210 and one or more cathodically active material layer 106. The cathode current collector layer 210 of the cathode material may comprise aluminum, an aluminum alloy, titanium or any other material suitable for use as a cathode current collector layer 210. The cathodically active material layer 106 may be formed as a first layer on a first surface of the cathode current collector layer 210 and a second layer on a second opposing surface of the cathode current collector layer 210. The cathodically active material layer 106 may be coated onto one or both sides of cathode current collector layer 210. Similarly, the cathodically active material layer 106 may be coated onto one or both major surfaces of cathode current collector layer 210. In another embodiment, the cathode current collector layer 210 may be intermixed with cathodically active material layer 106.

In one embodiment, the cathodically active material layer(s) 106 will each have a thickness of at least about 20 µm. For example, in one embodiment, the cathodically active material layer(s) 106 will each have a thickness of at least about 40 µm. By way of further example, in one such embodiment the cathodically active material layer(s) 106 will each have a thickness of at least about 60 µm. By way of further example, in one such embodiment the cathodically active material layers 106 will each have a thickness of at least about 100 µm. Typically, however, the cathodically active material layer(s) 106 will each have a thickness of less than about 90 µm or even less than about 70 µm.

In one embodiment, the positive electrode (e.g., cathode) material may comprise, or may be, an intercalation-type chemistry active material, a conversion chemistry active material, or a combination thereof.

Exemplary conversion chemistry materials useful in the present disclosure include, but are not limited to, S (or $Li_2S$ in the lithiated state), LiF, Fe, Cu, Ni, $FeF_2$, $FeO_dF_{3-2d}$, $FeF_3$, $CoF_3$, $CoF_2$, $CuF_2$, $NiF_2$, where 0≤d≤0.5, and the like.

Exemplary cathodically active materials also include any of a wide range of intercalation type cathodically active materials. For example, for a lithium-ion battery, the cathodically active material may comprise a cathodically active material selected from transition metal oxides, transition metal sulfides, transition metal nitrides, lithium-transition metal oxides, lithium-transition metal sulfides, and lithium-transition metal nitrides may be selectively used. The transition metal elements of these transition metal oxides, transition metal sulfides, and transition metal nitrides can include metal elements having a d-shell or f-shell. Specific examples of such metal element are Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pb, Pt, Cu, Ag, and Au. Additional cathode active materials include $LiCoO_2$, $LiNi_{0.5}Mn_{1.5}O_4$, $Li(Ni_xCo_yAl_z)O_2$, $LiFePO_4$, $Li_2MnO_4$, $V_2O_5$, molybdenum oxysulfides, phosphates, silicates, vanadates, sulfur, sulfur compounds, oxygen (air), $Li(Ni_xMn_yCo_z)O_2$, and combinations thereof.

In general, the cathode current collector 210 will have an electrical conductivity of at least about $10^3$ Siemens/cm. For example, in one such embodiment, the cathode current collector 210 will have a conductivity of at least about $10^4$ Siemens/cm. By way of further example, in one such embodiment, the cathode current collector 210 will have a conductivity of at least about $10^5$ Siemens/cm. Exemplary electrically conductive materials suitable for use as cathode current collectors 210 include metals, such as aluminum, nickel, cobalt, titanium, and tungsten, and alloys thereof.

Referring again to FIG. 2, in one embodiment, the electrically insulating separator layer(s) 108 is/are adapted to electrically isolate each member of the anodically active material layer 104 from each member of the cathodically active material layer 106. Electrically insulating separator layer 108 will typically include a microporous separator material that can be permeated with a non-aqueous electrolyte; for example, in one embodiment, the microporous separator material includes pores having a diameter of at least 50 Å, more typically in the range of about 2,500 Å, and a porosity in the range of about 25% to about 75%, more typically in the range of about 35-55%.

In one embodiment, the electrically insulating separator material layers 108 will each have a thickness of at least about 4 µm. For example, in one embodiment, the electrically insulating separator material layer 108 will each have a thickness of at least about 8 µm. By way of further example, in one such embodiment the electrically insulating separator material layer 108 will each have a thickness of at least about 12 µm. By way of further example, in one such embodiment the electrically insulating separator material layer 108 will each have a thickness of at least about 15 µm. In another embodiment the electrically insulating separator material layer 108 will each have a thickness of at least about 25 µm. In another embodiment the electrically insulating separator material layer 108 will each have a thickness of at least about 50 µm. Typically, however, the electrically insulating separator material layer 108 will each have a thickness of less than about 12 µm or even less than about 10 µm.

In general, the separator material for the separator layer(s) 108 may be selected from a wide range of separator materials having the capacity to conduct carrier ions between the positive and negative active material of a unit cell. For example, the separator material may comprise a microporous separator material that may be permeated with a liquid, nonaqueous electrolyte. Alternatively, the separator material may comprise a gel or solid electrolyte capable of conducting carrier ions between the positive and negative electrodes of a unit cell.

In one embodiment, the separator material may comprise a polymer based electrolyte. Exemplary polymer electrolytes include PEO-based polymer electrolytes, polymer-ceramic composite electrolytes, polymer-ceramic composite electrolytes, and polymer-ceramic composite electrolyte.

In another embodiment, the separator material may comprise an oxide based electrolyte. Exemplary oxide-based electrolytes include lithium lanthanum titanate ($Li_{0.34}La_{0.56}TiO_3$), Al-doped lithium lanthanum zirconate ($Li_{6.24}La_3Zr_2Al_{0.24}O_{11.98}$), Ta-doped lithium lanthanum zirconate ($Li_{6.4}La_3Zn_{1.4}Ta_{0.6}O_{12}$) and lithium aluminum titanium phosphate ($Li_{1.4}Al_{0.4}Ti_{1.6}(PO_4)_3$).

In another embodiment, the separator material may comprise a solid electrolyte. Exemplary solid electrolytes include sulfide based electrolytes such as lithium tin phosphorus sulfide ($Li_{10}SnP_2S_{12}$), lithium phosphorus sulfide ($\beta$-$Li_3PS_4$) and lithium phosphorus sulfur chloride iodide ($Li_6PS_5Cl_{0.9}I_{0.1}$).

In one embodiment, the separator material comprises a microporous separator material comprising a particulate material and a binder, and having a porosity (void fraction) of at least about 20 vol. %. The pores of the microporous separator material will have a diameter of at least 50 Å and will typically fall within the range of about 250 to 2,500 Å. The microporous separator material will typically have a porosity of less than about 75%. In one embodiment, the microporous separator material has a porosity (void fraction) of at least about 25 vol %. In one embodiment, the microporous separator material will have a porosity of about 35-55%.

The binder for the microporous separator material may be selected from a wide range of inorganic or polymeric materials. For example, in one embodiment, the binder is an organic material selected from the group consisting of silicates, phosphates, aluminates, aluminosilicates, and hydroxides such as magnesium hydroxide, calcium hydroxide, etc. For example, in one embodiment, the binder is a fluoropolymer derived from monomers containing vinylidene fluoride, hexafluoropropylene, tetrafluoropropene, and the like. In another embodiment, the binder is a polyolefin such as polyethylene, polypropylene, or polybutene, having any of a range of varying molecular weights and densities. In another embodiment, the binder is selected from the group consisting of ethylene-diene-propene terpolymer, polystyrene, polymethyl methacrylate, polyethylene glycol, polyvinyl acetate, polyvinyl butyral, polyacetal, and polyethyleneglycol diacrylate. In another embodiment, the binder is selected from the group consisting of methyl cellulose, carboxymethyl cellulose, styrene rubber, butadiene rubber, styrene-butadiene rubber, isoprene rubber, polyacrylamide, polyvinyl ether, polyacrylic acid, polymethacrylic acid, and polyethylene oxide. In another embodiment, the binder is selected from the group consisting of acrylates, styrenes, epoxies, and silicones. In another embodiment, the binder is a copolymer or blend of two or more of the aforementioned polymers.

The particulate material comprised by the microporous separator material may also be selected from a wide range of materials. In general, such materials have a relatively low electronic and ionic conductivity at operating temperatures and do not corrode under the operating voltages of the battery electrode or current collector contacting the microporous separator material. For example, in one embodiment, the particulate material has a conductivity for carrier ions (e.g., lithium) of less than $1\times10-4$ S/cm. By way of further example, in one embodiment, the particulate material has a conductivity for carrier ions of less than $1\times10^{-5}$ S/cm. By way of further example, in one embodiment, the particulate material has a conductivity for carrier ions of less than $1\times10^{-6}$ S/cm. Exemplary particulate materials include particulate polyethylene, polypropylene, a $TiO_2$-polymer composite, silica aerogel, fumed silica, silica gel, silica hydrogel, silica xerogel, silica sol, colloidal silica, alumina, titania, magnesia, kaolin, talc, diatomaceous earth, calcium silicate, aluminum silicate, calcium carbonate, magnesium carbonate, or a combination thereof. For example, in one embodiment, the particulate material comprises a particulate oxide or nitride such as $TiO_2$, $SiO_2$, $Al_2O_3$, $GeO_2$, $B_2O_3$, $Bi_2O_3$, BaO, ZnO, $ZrO_2$, BN, $Si_3N_4$, $Ge_3N_4$. See, for example, P. Arora and J. Zhang, "Battery Separators" Chemical Reviews 2004, 104, 4419-4462). In one embodiment, the particulate material will have an average particle size of about 20 nm to 2 micrometers, more typically 200 nm to 1.5 micrometers. In one embodiment, the particulate material will have an average particle size of about 500 nm to 1 micrometer.

In an alternative embodiment, the particulate material comprised by the microporous separator material may be bound by techniques such as sintering, binding, curing, etc. while maintaining the void fraction desired for electrolyte ingress to provide the ionic conductivity for the functioning of the battery.

In an assembled energy storage device, such as battery assembly 100, the microporous separator material is permeated with a non-aqueous electrolyte suitable for use as a secondary battery electrolyte. Typically, the non-aqueous electrolyte comprises a lithium salt and/or mixture of salts dissolved in an organic solvent and/or solvent mixture. Exemplary lithium salts include inorganic lithium salts such as $LiClO_4$, $LiBF_4$, $LiPF_6$, $LiAsF_6$, LiCl, and LiBr; and organic lithium salts such as $LiB(C_6H_5)_4$, $LiN(SO_2CF_3)_2$, $LiN(SO_2CF_3)_3$, $LiNSO_2CF_3$, $LiNSO_2CF_5$, $LiNSO_2C_4F_9$, $LiNSO_2C_5F_{11}$, $LiNSO_2C_6F_{13}$, and $LiNSO_2C_7F_{15}$. Exemplary organic solvents to dissolve the lithium salt include cyclic esters, chain esters, cyclic ethers, and chain ethers. Specific examples of the cyclic esters include propylene carbonate, butylene carbonate, γ-butyrolactone, vinylene carbonate, 2-methyl-γ-butyrolactone, acetyl-γ-butyrolactone, and γ-valerolactone. Specific examples of the chain esters include dimethyl carbonate, diethyl carbonate, dibutyl carbonate, dipropyl carbonate, methyl ethyl carbonate, methyl butyl carbonate, methyl propyl carbonate, ethyl butyl carbonate, ethyl propyl carbonate, butyl propyl carbonate, alkyl propionates, dialkyl malonates, and alkyl acetates. Specific examples of the cyclic ethers include tetrahydrofuran, alkyltetrahydrofurans, dialkyltetrahydrofurans, alkoxytetrahydrofurans, dialkoxytetrahydrofurans, 1,3-dioxolane, alkyl-1,3-dioxolanes, and 1,4-dioxolane. Specific examples of the chain ethers include 1,2-dimethoxyethane, 1,2-diethoxythane, diethyl ether, ethylene glycol dialkyl ethers, diethylene glycol dialkyl ethers, triethylene glycol dialkyl ethers, and tetraethylene glycol dialkyl ethers.

In one embodiment, the microporous separator layer(s) 108 may be permeated with a non-aqueous, organic electrolyte including a mixture of a lithium salt and a high-purity organic solvent. In addition, the electrolyte may be a polymer using a polymer electrolyte or a solid electrolyte.

With further reference to FIGS. 1 and 2, in one embodiment, the bus bars 110 and 112 are placed through the bus bar openings (not shown) of the respective electrode or counter-electrode (e.g., anode or cathode, as the case may be) to connect the anode current collectors 206 to one another in parallel (in a battery comprising multiple electrode sub-units), and the other of the bus bars connects the cathode current collectors 210 to one another in parallel in a battery comprising multiple unit cells 200. In one embodiment, the bus bars 110, 112 are welded or otherwise electrically coupled to current collector tabs 120 that are folded down respectively, prior to welding. In one embodiment, the bus bar 110 is a copper bus bar and is welded to anode tabs of the anode current collector layer 206, and the bus bar 112 is an aluminum bus bar and is welded to cathode tabs of the cathode current collector layer 210. However, in other embodiments, the bus bars 110, 112 may be any suitable conductive material to allow battery assembly 100 to function as described herein. The welds may be made using a laser welder, friction welding, ultrasonic welding or any suitable welding method for welding the bus bars 110 and 112 to the electrode tabs 120. In one embodiment, each of the bus bars 110 and 112 are in electrical contact with all of the electrode tabs 120 for the anode and cathode, respectively.

As referred to herein, a member of the anode population comprises at least an anode current collector 206 and an anodically active material layer 104. In some embodiments, a member of an anode population comprises an anode current collector 206 and an anodically active material layer 104 disposed on each major surface of the anode current collector 206 The length of the members of the anode population members will vary depending upon the energy storage device and its intended use. In general, however, the members of the anode populations will typically have a length in the range of about 5 mm to about 500 mm. For example, in one such embodiment, the members of the anode population have a length of about 10 mm to about 250 mm. By way of further example, in one such embodiment the members of the anode population have a length of about 25 mm to about 100 mm.

The width (Y-axis extent) of the members of the anode population will also vary depending upon the energy storage device and its intended use. In general, however, each member of the anode population will typically have a width within the range of about 0.01 mm to 2.5 mm. For example, in one embodiment, the width of each member of the anode population will be in the range of about 0.025 mm to about 2 mm. By way of further example, in one embodiment, the width of each member of the anode population will be in the range of about 0.05 mm to about 1 mm.

The height (Z-axis extent) of the members of the anode population will also vary depending upon the energy storage device and its intended use. In general, however, members of the anode population will typically have a height within the range of about 0.05 mm to about 25 mm. For example, in one embodiment, the height of each member of the anode population will be in the range of about 0.05 mm to about 5 mm. By way of further example, in one embodiment, the height of each member of the anode population will be in the range of about 0.1 mm to about 1 mm. According to one embodiment, the members of the anode population include one or more first electrode members having a first height, and one or more second electrode members having a second height that is other than the first. In yet another embodiment, the different heights for the one or more first electrode members and one or more second electrode members may be selected to accommodate a predetermined shape for an electrode assembly, such as an electrode assembly shape having a different heights along one or more of the longitudinal and/or transverse axis, and/or to provide predetermined performance characteristics for the secondary battery. According to another embodiment, the members of the anode population include one or more first electrode members having a first width, and one or more second electrode members having a second width that is other than the first. In yet another embodiment, the different widths for the one or more first electrode members and one or more second electrode members may be selected to accommodate a predetermined shape for an electrode assembly, such as an electrode assembly shape having different widths and/or to provide predetermined performance characteristics for the secondary battery. According to yet another embodiment, the members of the anode population include one or more first electrode members having a first length, and one or more second electrode members having a second length that is other than the first. In yet another embodiment, the different lengths for the one or more first electrode members and one or more second electrode members may be selected to accommodate a predetermined shape for an electrode assembly, such as an electrode assembly shape having different lengths and/or to provide predetermined performance characteristics for the secondary battery.

In general, members of the anode population have a length (X-axis extent) that is substantially greater than each of its width and its height. For example, in one embodiment, the ratio of length to each of width and height is at least 5:1, respectively (that is, the ratio of length to width is at least 5:1, respectively and the ratio of length to height is at least 5:1, respectively), for each member of the anode population. By way of further example, in one embodiment the ratio of length to each of width and height is at least 10:1. By way of further example, in one embodiment, the ratio of length to each of width and height is at least 15:1. By way of further example, in one embodiment, the ratio of length to each of width and height is at least 20:1, for each member of the anode population.

In one embodiment, the ratio of the height to the width of the members of the anode population is at least 0.4:1, respectively. For example, in one embodiment, the ratio of height to width will be at least 2:1, respectively, for each member of the anode population. By way of further example, in one embodiment the ratio of height to width will be at least 10:1, respectively. By way of further example, in one embodiment the ratio of height to width will be at least 20:1, respectively. Typically, however, the ratio of height to width will generally be less than 1,000:1, respectively. For example, in one embodiment the ratio of height to width will be less than 500:1, respectively. By way of further example, in one embodiment the ratio of height to width will be less than 100:1, respectively. By way of further example, in one embodiment the ratio of height to width will be less than 10:1, respectively. By way of further example, in one embodiment the ratio of height to width will be in the range of about 2:1 to about 100:1, respectively, for each member of the anode population.

As referred to herein, a member of the cathode population comprises at least a cathode current collector 210 and a cathodically active material layer 106. The length of the members of the cathode population will vary depending upon the energy storage device and its intended use. In general, however, each member of the cathode population will typically have a length in the range of about 5 mm to about 500 mm. For example, in one such embodiment, each member of the cathode population has a length of about 10 mm to about 250 mm. By way of further example, in one such embodiment each member of the cathode population has a length of about 25 mm to about 100 mm.

The width (Y-axis extent) of the members of the cathode population will also vary depending upon the energy storage device and its intended use. In general, however, members of the cathode population will typically have a width within the range of about 0.01 mm to 2.5 mm. For example, in one embodiment, the width of each member of the cathode population will be in the range of about 0.025 mm to about 2 mm. By way of further example, in one embodiment, the width of each member of the cathode population will be in the range of about 0.05 mm to about 1 mm.

The height (Z-axis extent) of the members of the cathode population will also vary depending upon the energy storage device and its intended use. In general, however, members of the cathode population will typically have a height within the range of about 0.05 mm to about 25 mm. For example, in one embodiment, the height of each member of the cathode population will be in the range of about 0.05 mm to about 5 mm. By way of further example, in one embodiment, the height of each member of the cathode population will be in the range of about 0.1 mm to about 1 mm. According to one embodiment, the members of the cathode population include one or more first cathode members having a first height, and one or more second cathode members having a second height that is other than the first. In yet another embodiment, the different heights for the one or more first cathode members and one or more second cathode members may be selected to accommodate a predetermined shape for an electrode assembly, such as an electrode assembly shape having a different heights along one or more of the longitudinal and/or transverse axis, and/or to provide predetermined performance characteristics for the secondary battery. According to another embodiment, the members of the cathode population include one or more first electrode members having a first width, and one or more second electrode members having a second width that is other than the first. In yet another embodiment, the different widths for the one or more first electrode members and one or more second electrode members may be selected to accommodate a predetermined shape for an electrode assembly, such as an electrode assembly shape having different widths and/or to provide predetermined performance characteristics for the secondary battery. According to yet another embodiment, the members of the cathode population include one or more first electrode members having a first length, and one or more second electrode members having a second length that is other than the first. In yet another embodiment, the different lengths for the one or more first electrode members and one or more second electrode members may be selected to accommodate a predetermined shape for an electrode assembly, such as an electrode assembly shape having different lengths and/or to provide predetermined performance characteristics for the secondary battery.

In general, each member of the cathode population has a length (X-axis extent) that is substantially greater than its width and substantially greater than its height. For example, in one embodiment, the ratio of length to each of width and height is at least 5:1, respectively (that is, the ratio of length to width is at least 5:1, respectively and the ratio of length to height is at least 5:1, respectively), for each member of the cathode population. By way of further example, in one embodiment the ratio of length to each of width and height is at least 10:1 for each member of the cathode population. By way of further example, in one embodiment, the ratio of length to each of width and height is at least 15:1 for each member of the cathode population. By way of further example, in one embodiment, the ratio of length to each of width and height is at least 20:1 for each member of the cathode population.

In one embodiment, the ratio of the height to the width of the members of the cathode population is at least 0.4:1, respectively. For example, in one embodiment, the ratio of height to width will be at least 2:1, respectively, for each member of the cathode population. By way of further example, in one embodiment the ratio of height to width will be at least 10:1, respectively, for each member of the cathode population. By way of further example, in one embodiment the ratio of height to width will be at least 20:1, respectively, for each member of the cathode population. Typically, however, the ratio of height to width will generally be less than 1,000:1, respectively, for each member of the anode population. For example, in one embodiment the ratio of height to width will be less than 500:1, respectively, for each member of the cathode population. By way of further example, in one embodiment the ratio of height to width will be less than 100:1, respectively. By way of further example, in one embodiment the ratio of height to width will be less than 10:1, respectively. By way of further example, in one embodiment the ratio of height to width will be in the range of about 2:1 to about 100:1, respectively, for each member of the cathode population.

In one embodiment, anode current collector 206 also has an electrical conductance that is substantially greater than the electrical conductance of the negative electrode active material layer 104. It should be noted that negative electrode active material layer 104 may be the same or similar to anodically active material layer 104. For example, in one embodiment the ratio of the electrical conductance of anode current collector 206 to the electrical conductance of the anodically active material layer 104 is at least 100:1 when there is an applied current to store energy in the device or an applied load to discharge the device. By way of further example, in some embodiments the ratio of the electrical conductance of anode current collector 206 to the electrical conductance of the anodically active material layer 104 is at least 500:1 when there is an applied current to store energy in the device or an applied load to discharge the device. By way of further example, in some embodiments the ratio of the electrical conductance of anode current collector 206 to the electrical conductance of the negative electrode active material layer 104 is at least 1000:1 when there is an applied current to store energy in the device or an applied load to discharge the device. By way of further example, in some embodiments the ratio of the electrical conductance of anode current collector 206 to the electrical conductance of the anodically active material layer 104 is at least 5000:1 when there is an applied current to store energy in the device or an applied load to discharge the device. By way of further example, in some embodiments the ratio of the electrical conductance of anode current collector 206 to the electrical conductance of the anodically active material layer 104 is at least 10,000:1 when there is an applied current to store energy in the device or an applied load to discharge the device.

In general, the cathode current collector layer 210 may comprise a metal such as aluminum, carbon, chromium, gold, nickel, NiP, palladium, platinum, rhodium, ruthenium, an alloy of silicon and nickel, titanium, or a combination thereof (see "Current collectors for positive electrodes of lithium-based batteries" by A. H. Whitehead and M. Schreiber, Journal of the Electrochemical Society, 152(11) A2105-A2113 (2005)). By way of further example, in one embodiment, cathode current collector layer 210 comprises gold or an alloy thereof such as gold silicide. By way of further example, in one embodiment, cathode current collector layer 210 comprises nickel or an alloy thereof such as nickel silicide.

Figure 3:
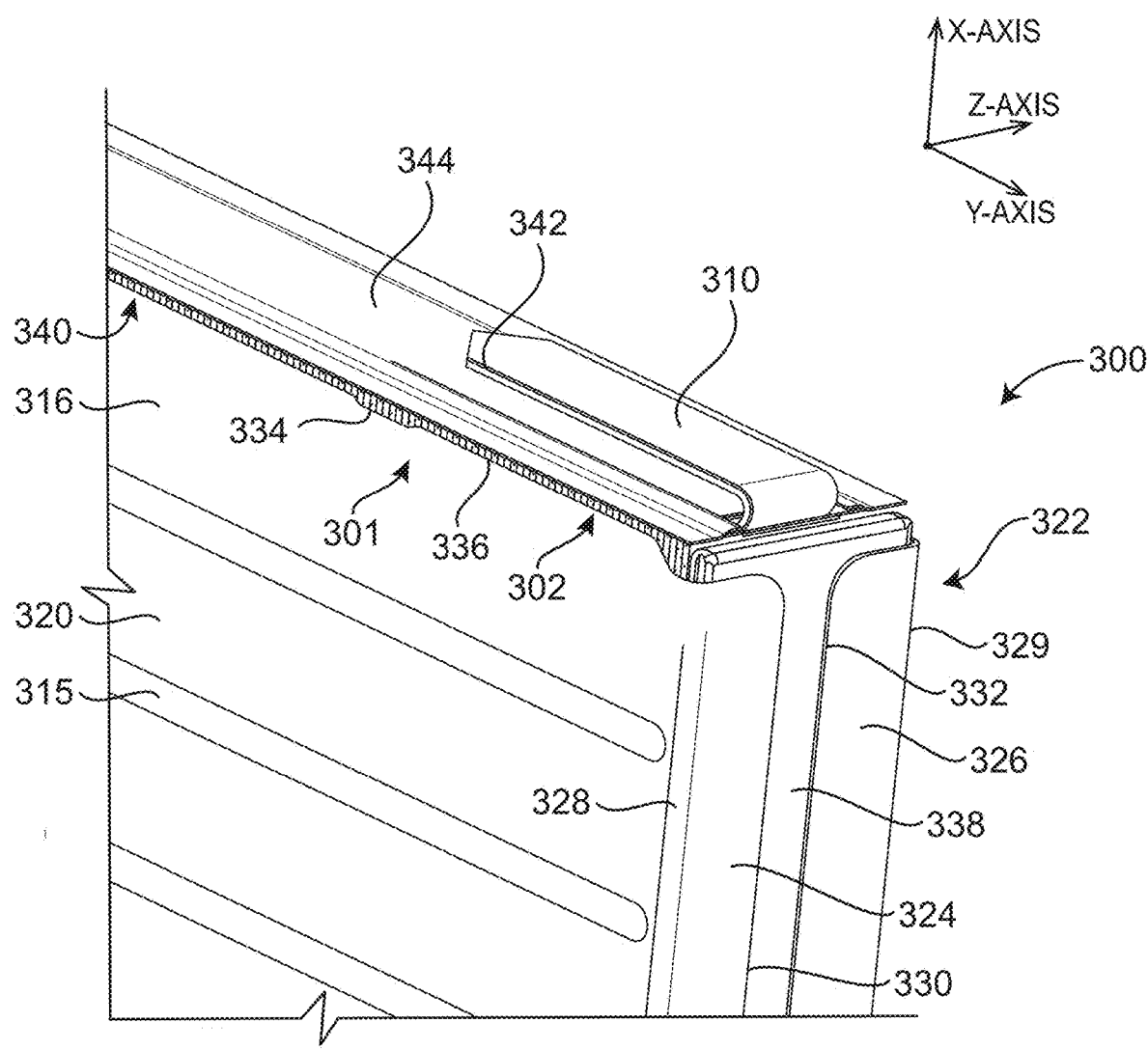
FIG. 3 is an enlarged partial perspective view of a battery assembly within a constraint according to the present disclosure.

Reference is now made to FIG. 3. FIG. 3 is an enlarged partial detail perspective view of a battery assembly 300 (which may be the same as or similar to battery assembly 100) prior to reinforcement structure or outer packaging (e.g., an enclosure) being placed thereon. The battery assembly 300 includes an electrode assembly 301 comprising a population of electrode sub-units 302 (which may be the same or similar to sub-units 102) organized in a stacked arrangement in the Y-Axis direction. Each of the electrode sub-units 302 comprises at least an electrode current conductor layer, an electrode layer comprising an electrode active material (e.g., anodically active material layer), a separator layer, a counter-electrode layer comprising a counter-electrode active material (e.g. cathodically active material layer), and a counter-electrode current collector layer.

In one suitable embodiment, the electrode assembly 301 is enclosed within a volume defined by a constraint 316 (which, in some embodiments, may be the same as or similar to casing 116). In one embodiment, the constraint 316 comprises stainless steel, such as SS 316, 440C or 440C hard. In other embodiments, the constraint comprises aluminum (e.g., aluminum 7075-T6, hard H18, etc.), titanium (e.g., 6Al-4V), beryllium, beryllium copper (hard), copper ($O_2$ free, hard), nickel, other metals or metal alloys, composite, polymer, ceramic (e.g., alumina (e.g., sintered or Coorstek AD96), zirconia (e.g., Coorstek YZTP), yttriastabilizedzirconia (e.g., ENrG E-Strate®)), glass, tempered glass, polyetheretherketone (PEEK) (e.g., Aptiv 1102), PEEK with carbon (e.g., Victrex 90HMF40 or Xycomp 1000-04), polyphenylene sulfide (PPS) with carbon (e.g., Tepex Dynalite 207), polyetheretherketone (PEEK) with 30% glass, (e.g., Victrex 90HMF40 or Xycomp 1000-04), polyimide (e.g., Kapton®), E Glass Std Fabric/Epoxy, 0 deg, E Glass UD/Epoxy, 0 deg, Kevlar Std Fabric/Epoxy, 0 deg, Kevlar UD/Epoxy, 0 deg, Carbon Std Fabric/Epoxy, 0 deg, Carbon UD/Epoxy, 0 deg, Toyobo Zylon® HM Fiber/Epoxy, Kevlar 49 Aramid Fiber, S Glass Fibers, Carbon Fibers, Vectran UM LCP Fibers, Dyneema, Zylon, or other suitable material.

Figure 3A:
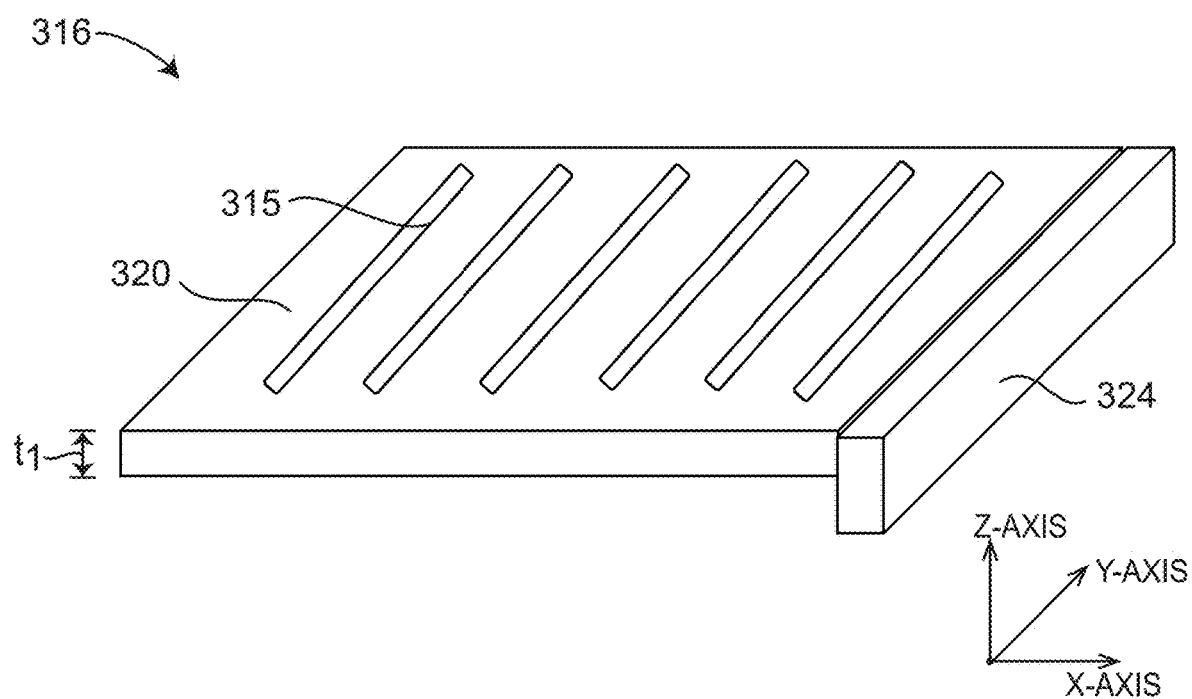
FIG. 3A is a perspective view of an embodiment of a constraint according to the present disclosure.

The constraint 316 comprises a first cover 320 (i.e., a first primary growth constraint) generally aligned along the X-Y plane on one side of the battery assembly 300, and a second cover (i.e., a second primary growth constraint) (not shown in FIG. 3 but substantially the same as the first cover 320 and indicated generally at 322) on an opposing side of the battery assembly 300 that is separated in the Z-axis direction from the first cover 320, also generally aligned along the X-Y plane, having a thickness t1 (FIG. 3A) measured in the Z-axis direction. Thickness ($t_1$) of the constraint 316 may depend upon a range of factors including, for example, the material(s) of construction of the constraint 316, the overall dimensions of the electrode assembly 301, and the composition of the electrode and counter-electrodes. In some embodiments, for example, the constraint 316 will comprise a sheet having a thickness $t_1$ in the range of about 10 to about 100 micrometers. For example, in one such embodiment, the constraint 316 comprises a stainless steel sheet (e.g., SS316) having a thickness of about 30 µm. By way of further example, in another embodiment, the constraint 316 comprises an aluminum sheet (e.g., 7075-T6) having a thickness of about 40 µm. By way of further example, in another embodiment, the constraint 316 comprises a zirconia sheet (e.g., Coorstek YZTP) having a thickness of about 30 µm. By way of further example, in another embodiment, the constraint 316 comprises an E Glass UD/Epoxy 0 deg sheet having a thickness of about 75 µm. By way of further example, in another such embodiment, the constraint 316 comprises 12 µm carbon fibers at >50% packing density. Each of the first cover 320 and second cover 322 may comprise one or more features 315, which may be formed as indentations, through cuts, holes or the like. In one embodiment, the features 315 facilitate pre-lithiation of the battery assembly 300, such as from an external lithium foil electrode (not shown). In such embodiments, the features 315 allow lithium to diffuse therethrough for the facilitation of the pre-lithiation.

With reference again to FIG. 3, in one embodiment, there is a third cover 324 (i.e., a first secondary growth constraint) extending in the X-Z plane, and an opposing third cover separated in the Y-axis direction, and a fourth cover 326 (e.g., a second secondary growth constraint) extending in the X-Z plane and an opposing fourth cover separated in the Y-axis direction. In the embodiment shown in FIG. 3, the third cover 324 is defined by a folded portion of the first cover 320, that has been folded at a first corner 328, and the fourth cover 326 is defined by a folded portion of the second cover 322 that has been folded at a second corner 329. The first and second corners 328 and 329 may be radiused or angular corners. In one embodiment, first and second corners 328 and 329 are angles at from 90 degrees to 100 degrees. In other embodiments, the third and fourth cover may be a single cover. In one embodiment, the first secondary growth constraint 324 or the first primary growth constraint 320 is connected to surfaces (e.g., upper surfaces) of the electrode or counter-electrode structures of a subset of the unit cell population and the second primary growth constraint 322 or the second secondary growth constraint 326 is connected to other surfaces (e.g., lower surfaces) of the electrode or counter-electrode structures of a subset of the unit cell population.

In one embodiment, a casing edge gap 338 is defined between the third constraint 324 and fourth constraint 326, having a gap distance defined in the Z-axis direction. In one embodiment, the gap distance of casing edge gap 338, in the Z-axis direction, between the third constraint 324 and fourth constraint 326 is less than or equal to 50% of the Z-axis thickness of the battery assembly 300. It should be noted that the opposing side of the battery assembly 300 may include similar constraints to third and fourth constraints 324 and 326. The third constraint comprises a flap edge 330 defined along the X-axis and Z-Axis and the fourth constraint comprises a second flap edge 332 defined along the X-axis and Z-Axis.

Each of the first cover 320 and second cover 322 may comprise one or more notches 334 or lands 336 formed along an edge generally aligned with the Y-axis. In one embodiment, one or more of the size, shape, spacing and quantity of the notches 334 or lands 336 are determined based on manufacturing conditions or limitations. In one embodiment, the notches 334 or lands 336 may facilitate manufacturability, by easing a machining, stamping process, or tear-off of the first cover 320 or second cover 322 from a material stock used in the manufacturing process for the first cover 320 and second cover 322. In addition, the battery assembly 300 includes bus bar(s) 310 that are electrically coupled to one of the electrode sub-units 302. Due to the material thickness $t_1$ used for the constraint 316 the constraint comprises an edge surface 340 that protrudes in the Z-axis direction from the electrode assembly 301. Similarly, one or more of flap edges 330, 332 protrude in the Y-axis direction from the battery assembly 300. Additionally, the bus bar(s) 310 protrude from a side surface 344 of the battery in the X-axis direction at a bus bar edge 342.

Figure 4:
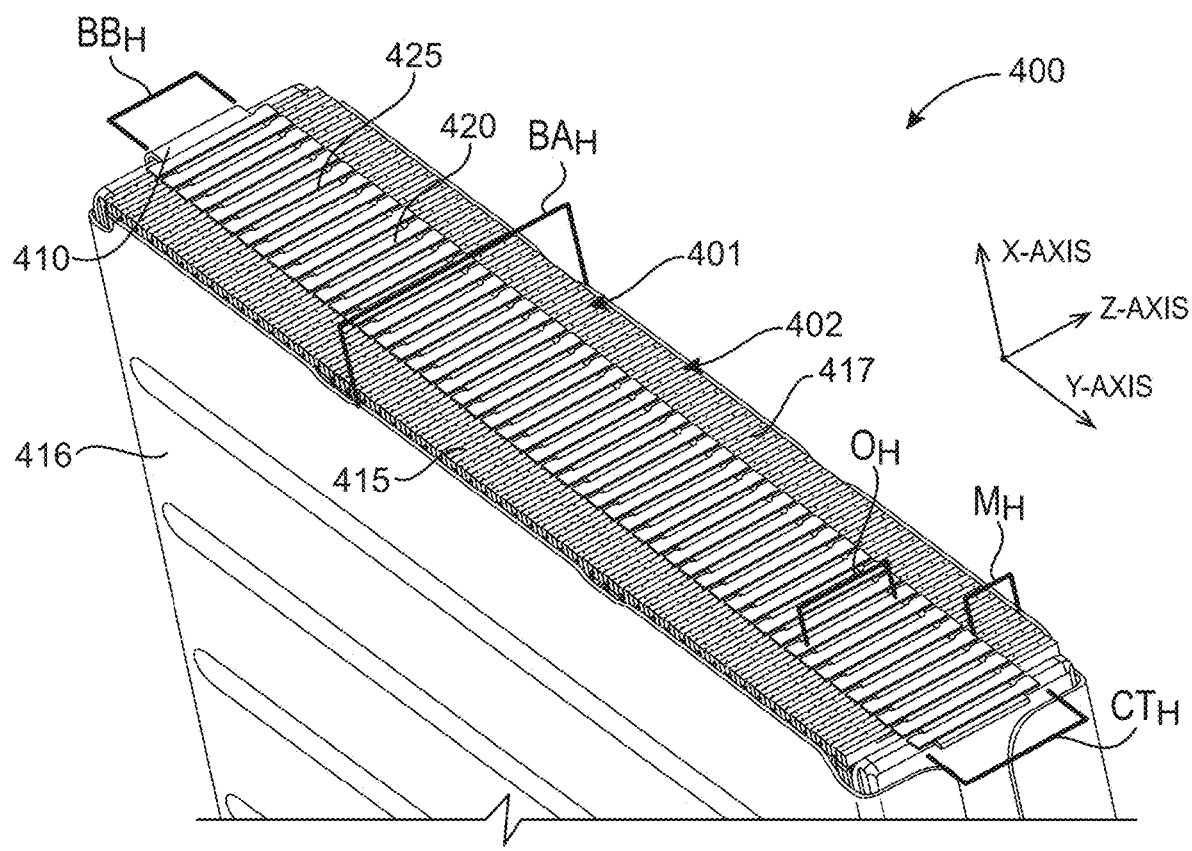
FIG. 4 is a perspective view of a battery assembly prior to application of a reinforcement structure according to the present disclosure.

With reference to FIG. 4, a battery assembly 400, which may be the same as or similar to battery assembly 300 is shown. In this embodiment, battery assembly 400 includes an electrode assembly 401 (which may be the same as or similar to electrode assembly 301) comprising a population of electrode sub-units 402 (which may be the same as or similar to sub-units 302, 102) organized in a stacked arrangement in the Y-axis direction. Each of the electrode sub-units 402 comprises at least an electrode current conductor layer, an electrode layer comprising an electrode active material (e.g., anodically active material layer), a separator layer, a counter-electrode layer comprising a counter-electrode active material (e.g. cathodically active material layer), and a counter-electrode current collector layer. In one suitable embodiment, the electrode assembly 401 is held within a constraint 416 (which, in some embodiments, may be the same as or similar to constraint 316).

A bus bar 410 (which may be the same as or similar to bus bar 310) extends along the Y-axis direction across each of the electrode sub-units 402. In this embodiment, a current collector tab 420 (which may be the same or similar to current collector tabs 120) extends from an electrode (e.g., anode or cathode) of each of the electrode sub-units 402. Each current collector tab 420 has a tab height $CT_H$ in the Z-axis direction. The bus bar 410 has a height $BB_H$ in the Z-axis direction. In one embodiment, each current collector tab 420 has an opening 425 that is sized and shaped to allow the bus bar 410 to pass therethrough. The opening 425 may be referred to as a "D-slot" and the opening may have a "D" shape in some embodiments. The opening 425 has a height OH in the Z-Axis direction that is at least as wide as the bus bar height $BB_H$, so as to allow the bus bar 410 to pass therethrough.

Typically, all of the current collector tabs 420 on a single side of the battery assembly 400 extend from the same type of electrode, such as all extending from anode electrodes or all from cathode electrodes. Accordingly, on an opposing side of the battery, an equivalent number of the other type of electrode will have the current collector tabs 420 extending therefrom. Thus, a single bus bar 410 may extend along the entirety of the length of the electrode sub-units 401. In the embodiment shown in FIG. 4, each of the current collector tabs is folded from the X-axis direction to the Y-Axis direction, each overlapping and in electrical contact with a portion of the bus bar 410. To secure the current collector tabs 420 to the bus bar 410, each of the current collector tabs 420 may be welded at one or more weld locations to the bus bar 410. In other embodiments, an adhesive may be used to secure each collector tab 420 to the bus bar 410. It has been found that under certain abusive conditions, such as drops, strikes or impacts, one or more of the welds of collector tabs 420 to bus bar 410 may completely or partially fail, causing an electrical disconnect between the collector tab 420 having a failed weld and the bus bar 410.

In some embodiments, the collector tabs 420 have a height $CT_H$ that is less than a height of the electrode sub-units 402. Accordingly, a first margin 415 and a second margin 417 of the electrode sub-units 402 are defined as extending from an outer edge of the battery assembly 400 to an outside edge of the collector tabs 420. Each of the first margin 415 and the second margin 417 has a margin height MH in the Z-axis direction.

Figure 5:
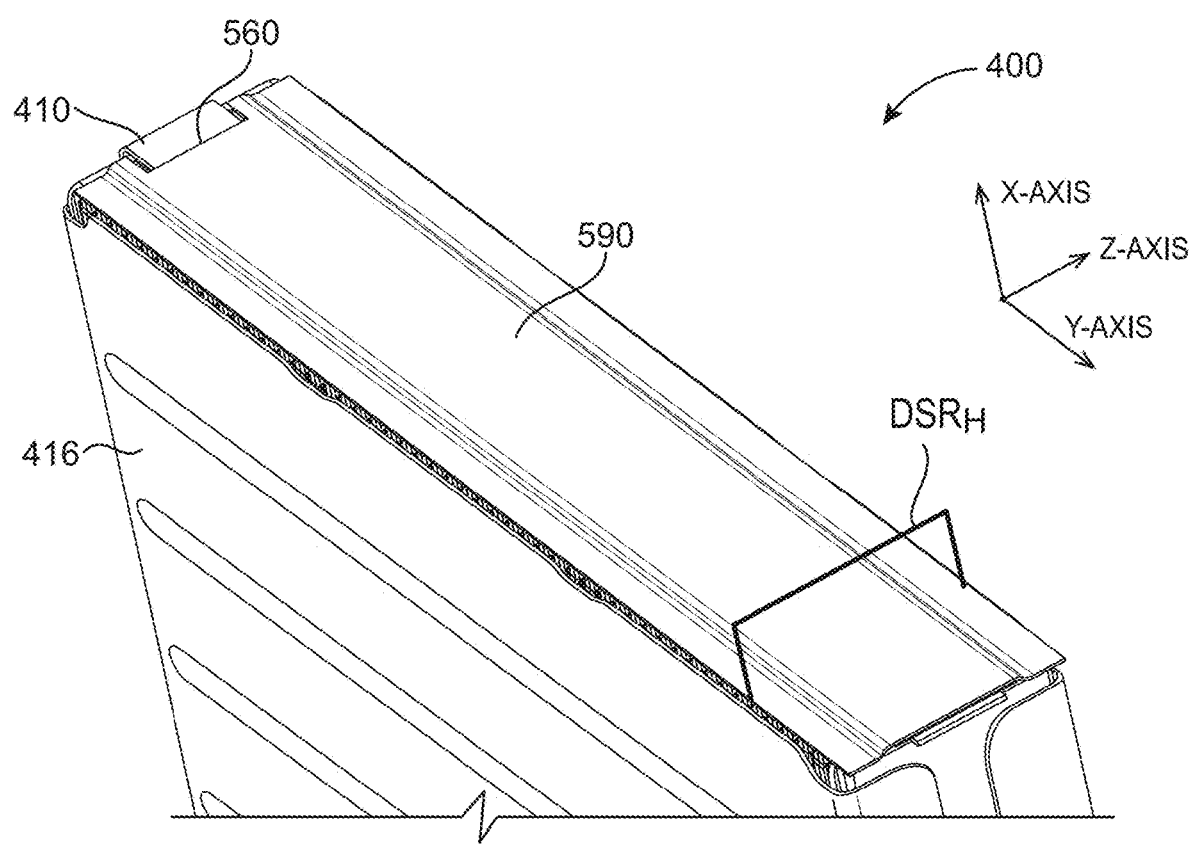
FIG. 5 is a perspective view of the battery assembly of FIG. 4 after application of the reinforcement structure according to an embodiment of the present disclosure.
Figure 6:
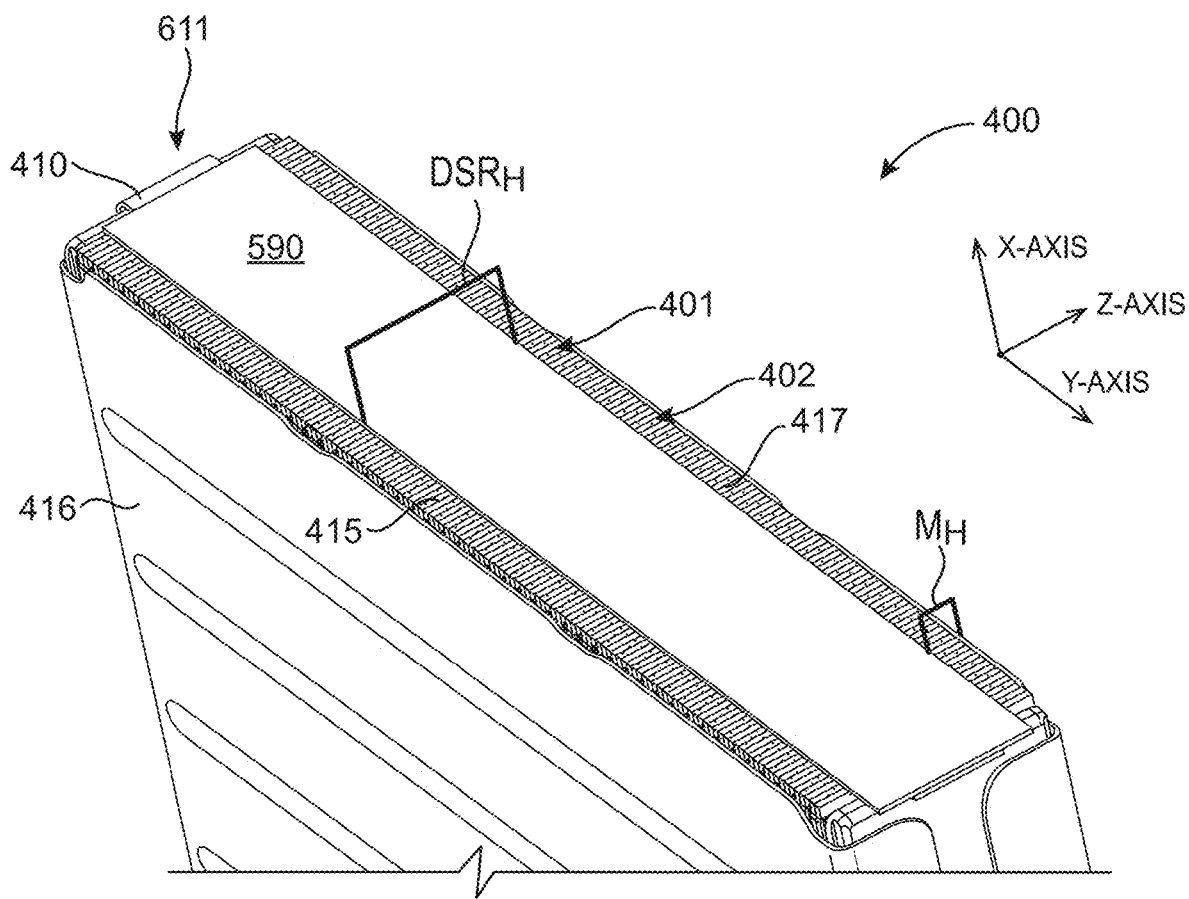
FIG. 6 is a perspective view of the battery assembly of FIG. 4 after application of the reinforcement structure according to another embodiment of the present disclosure.
Figure 7:
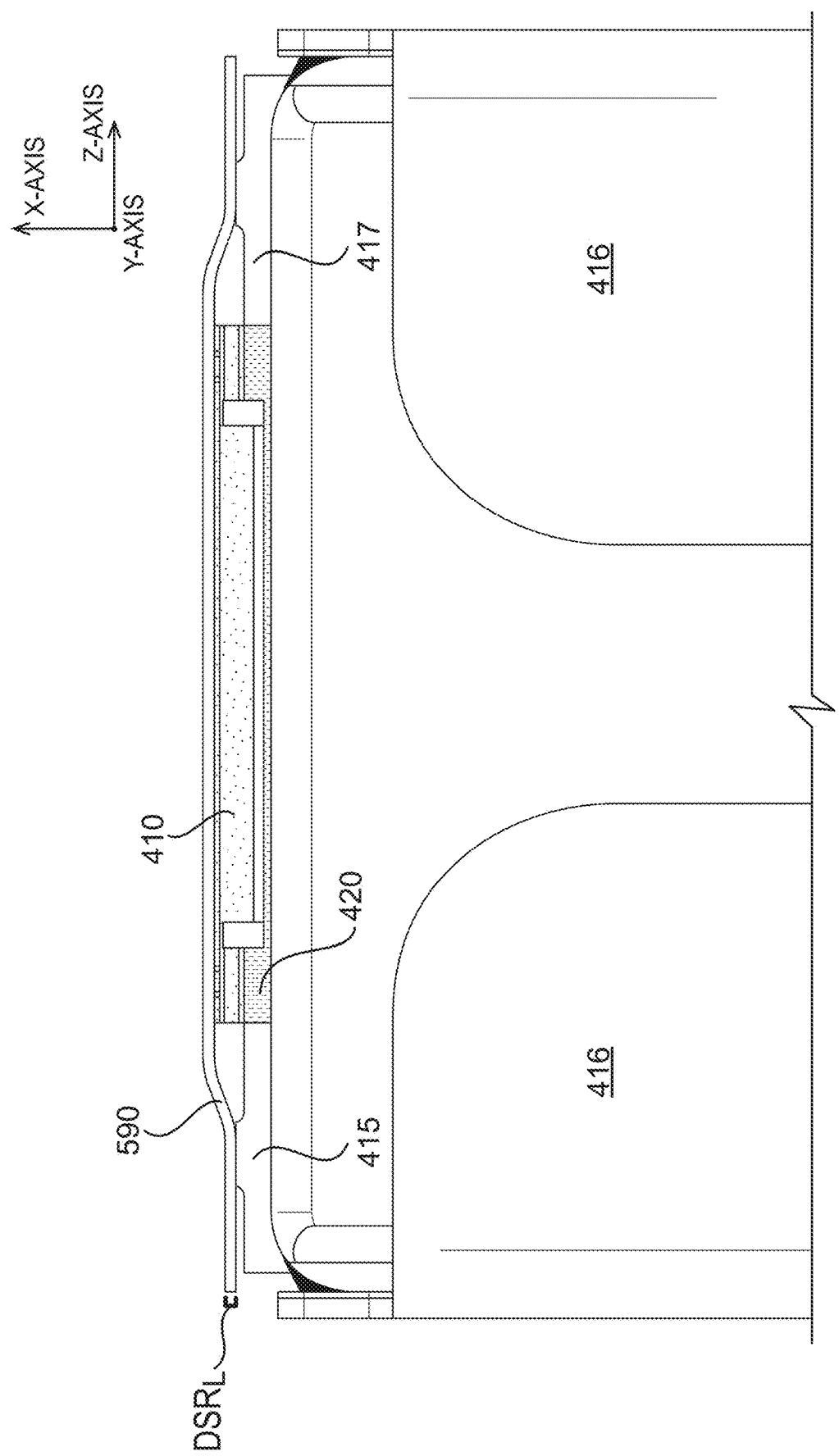
FIG. 7 is a front view of the battery assembly of FIG. 5 after application of the reinforcement structure according to an embodiment of the present disclosure.

With reference to FIGS. 5-7, in order to facilitate a reduction or elimination of the possibility that the abuse conditions may cause a failed weld, a reinforcement structure 590 may be utilized in some embodiments. FIG. 5 illustrates the battery assembly 400 shown in FIG. 4, with an embodiment of the reinforcement structure 590 applied thereto. The reinforcement structure 590 has a height $DSR_H$ in the Z-axis direction. In one embodiment, the height $DSR_H$ is equal to a height BAH (FIG. 4) of the battery assembly 400 as measured in the Z-axis direction. In this embodiment, the reinforcement structure 590 has a height $DSR_H$ that spans over first margin 415, second margin 417 and the collector tabs 420. The reinforcement structure includes, in one embodiment, a bus bar cutout 560 that defines an opening by which a portion of the bus bar 410 is exposed and may be folded from the Y-Z plane to the X-Z plane. In the embodiment illustrated in FIG. 6, the reinforcement structure 590 has a height $DSR_H$ substantially equivalent to the collector tab height $CT_H$ (FIG. 4), and extends along a Y-axis extent of the electrode sub-units 402, but leaves the folded end portion 611 of the bus bar 410 exposed.

In one embodiment, the reinforcement structure is a rigid structure comprising an electrically non-conductive material. In other embodiments, the reinforcement structure is a flexible or semi-flexible structure comprising one or more of polyvinylidene fluoride (PVDF), polyethylene (PE), ethylene acrylic acid (EAA), ethylene methacrylic acid (EMAA) or functional derivatives or copolymers or combinations thereof.

In one suitable embodiment, the reinforcement structure 590 comprises a polymer film. The polymer film is adhered to the battery assembly using a hot melt technique. By applying sufficient heat to the polymer material, the material reflows into any gaps and around edges of the collector tabs 420 and bus bar 410. In one embodiment, the polymer film is heat treated after it has been applied to the desired portion of the battery assembly 400, as described herein. In this embodiment, the polymer film is heat treated to a temperature within a range of from 80° C. to 130° C., such as 80° C., 85° C., 90° C., 95° C., 100° C., 105° C., 110° C., 115° C., 120° C., 125° C. and 130° C. In one embodiment, when heated to this temperature range, the polymer cross-links and significantly hardens to a rigid structure, thus forming the reinforcement structure 590. In other embodiments, when heated to the above-described temperature range, the polymer adheres to the battery assembly 400, but retains its flexibility or semi-flexible properties. In one embodiment, the reinforcement structure 590 has a length $DSR_L$ (FIG. 7) measured in the X-axis direction of from 25 μm to 500 μm, such as 25 μm, 50 μm, 75 μm, 100 μm, 125 μm, 150 μm, 175 μm, 200 μm, 225 μm, 250 μm, 275 μm, 300 μm, 325 μm, 350 μm, 375 μm, 400 μm, 425 μm, 450 μm, 475 μm or 500 μm. In one embodiment, the film forming the reinforcement structure is applied and has from a 15% to 40% reduction in length $DSR_L$ after heat treatment.

Figure 8:
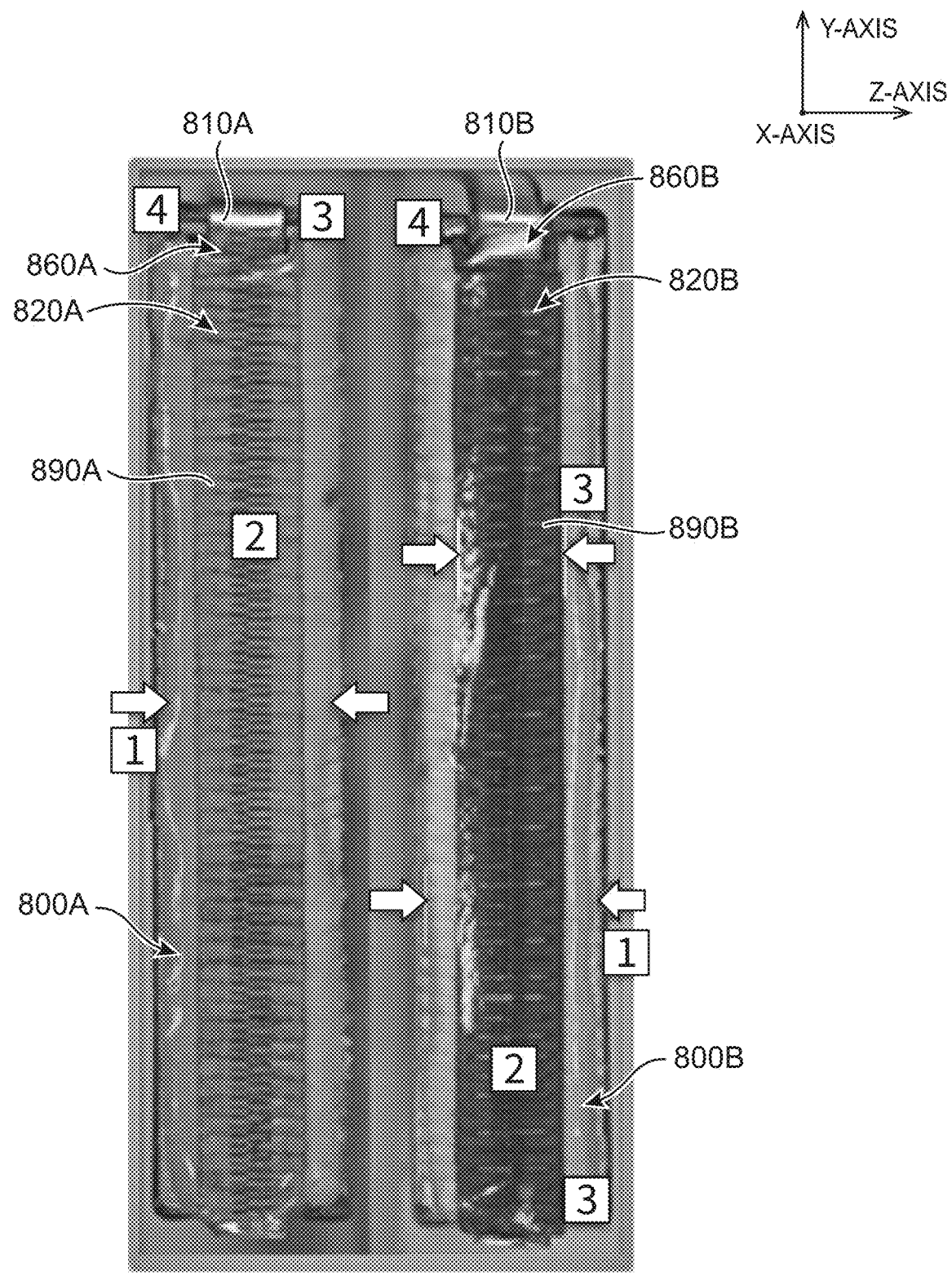
FIG. 8 is a photograph of a side of each of two battery assemblies after application of a reinforcement structure according to an embodiment of the present disclosure.

With reference to FIG. 8, a photograph of two exemplary battery assemblies 800A and 800B (which may be the same as or similar to battery assembly 400) after a reinforcement structure 890A and 890B (which may be the same as or similar to reinforcement structure 590) has been applied and heat treated is shown. As shown, the reinforcement structure 890A and 890B are each applied such that no portion of the reinforcement structures 890A or 890B extend beyond a Z-axis extent of the respective battery assemblies 800A and 800B (as shown as between arrows [1]). The reinforcement structures 890A and 890B are also substantially flat and smooth along the Y-Z plane, without any significant disruptions or protrusions, as denoted by boxes [2]. The reinforcement structures 890A and 890B each also respectively cover the Z-axis and Y-axis extents of all of the current collector tabs 820A and 820B (which may be the same as or similar to current collector tabs 420), and respectively cover the openings or D-slots 425 (FIG. 4) of the current collector tabs 820A and 820B, as denoted by boxes [3]. In addition, in the embodiment of FIG. 8, each of the reinforcement structures 890A and 890B include a notch 860A and 860B (which may be the same as or similar to bus bar cutouts 560) (also denoted at boxes [4]) respectively, such that the bus bars 810A and 810B are not covered by the reinforcement structures 890A and 890B.

Figure 9:
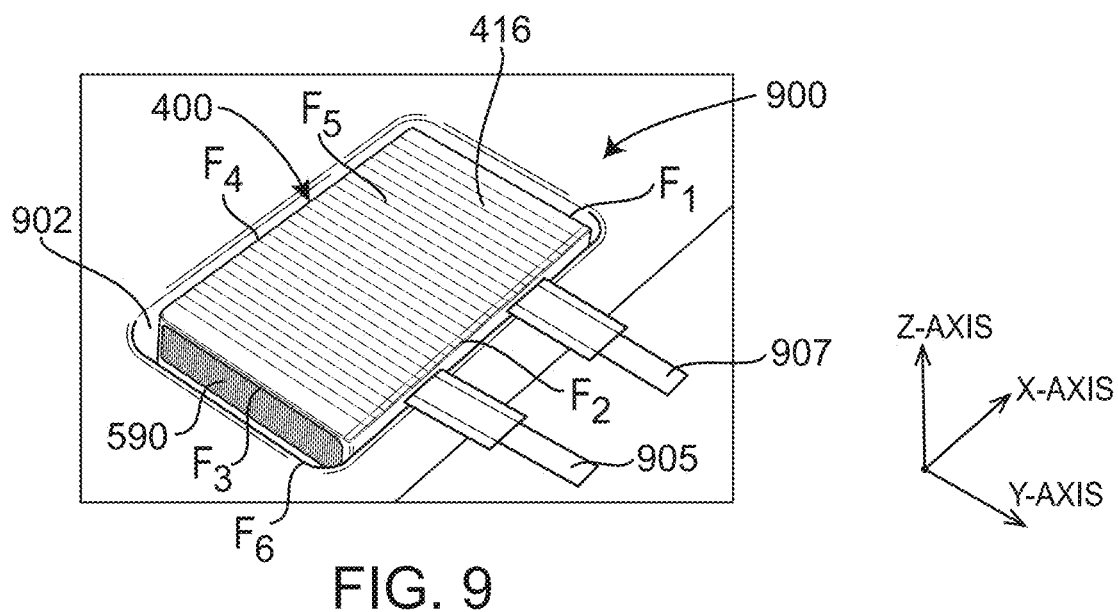
FIG. 9 is a perspective view of a battery assembly placed partially within a battery enclosure according to an embodiment of the present disclosure.
Figure 10:
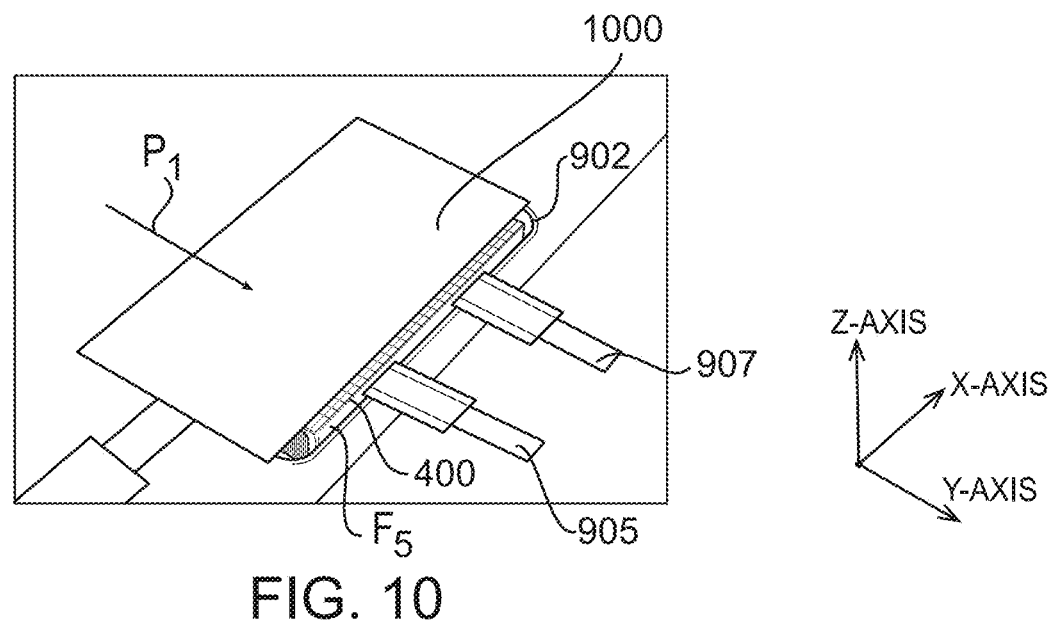
FIG. 10 is a perspective view of the battery assembly of FIG. 9 including a second cover of the battery enclosure according to an embodiment of the present disclosure.
Figure 11:
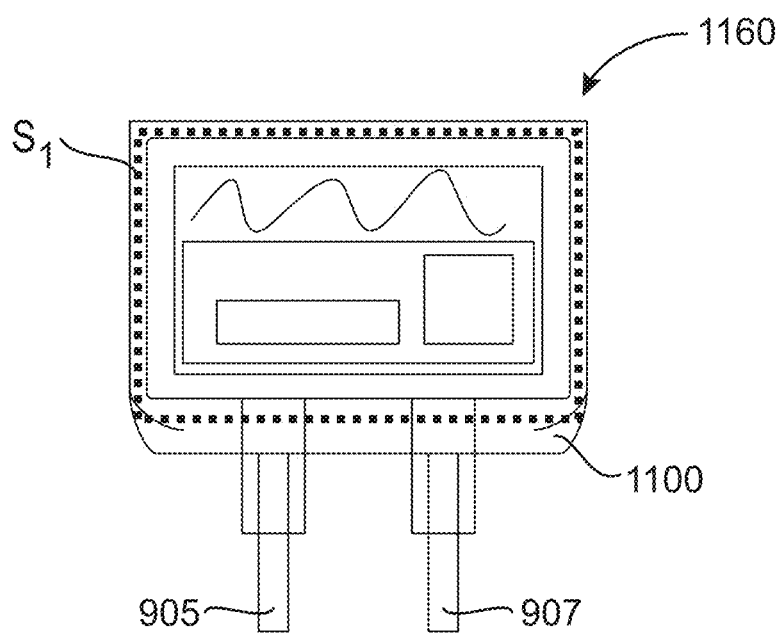
FIG. 11 is a top view of a completed battery after being sealed within the battery enclosure.
Figure 12:
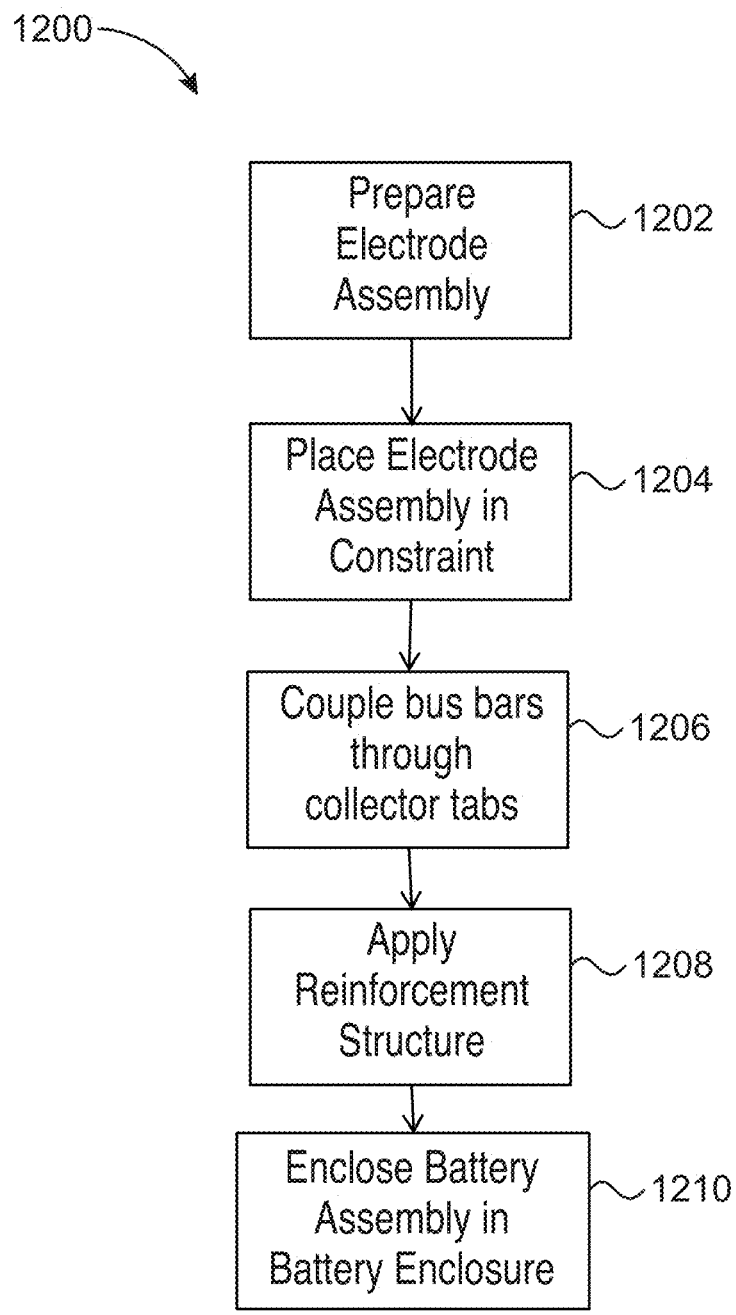
FIG. 12 is a schematic view of a method of preparing a battery assembly including a reinforcement structure according to the present disclosure.

Reference is now made to FIGS. 9-11. In one embodiment, subsequent to the application of the reinforcement structure 590, the battery assembly 400 is placed within a battery package 1100 to form a complete battery 1160. In embodiments, the battery package comprises a first enclosure layer 900 and a second enclosure layer 1000. Each of the first and second enclosure layers 900, 1000 may comprise a flexible or semi-flexible material, such as aluminum, polymer or the like. In one embodiment, one or more of the first and second enclosure layers 900, 1000 comprises a multi-layer aluminum polymer material, plastic, or the like. In one embodiment, one or more of the first and second enclosure layers 900, 1000 comprises a polymer material laminated on a metal substrate, such as aluminum.

In the embodiment illustrated in FIG. 9, the battery assembly 400 is placed on the first enclosure layer 900, such that a lower face $F_6$ of constraint 416 is in contact with the first enclosure layer 900. The battery assembly is shown with six mutually perpendicular faces, $F_1$-$F_6$. In one embodiment, the battery assembly 400 is placed within a recess 902 formed within the first enclosure layer 900. The recess 902 is sized and shaped to match the outer surface size and shape of the battery assembly 400. In one embodiment, second enclosure layer 1000 (FIG. 10) is placed over battery assembly 400, such that major face $F_5$ of constraint 416 is in contact with second enclosure layer 1000. The second enclosure layer 1000 may be positioned (such as by movement in the placement direction $P_1$) so as to cover the entirety of the major face $F_5$ and recess 902. Conductive terminals 905 and 907 remain uncovered by first and second enclosure layers 900, 1000. After proper placement of the second enclosure layer 1000, the first and second enclosure layers 900, 1000 are sealed along sealing edge $S_1$ (denoted by the dotted line in FIG. 11). In one embodiment, excess material of first and second enclosure layers 900, 1000 may be trimmed prior to, or subsequently to, sealing. The first and second enclosure layers may be sealed along sealing edge $S_1$ by welding, heat sealing, adhesive, combinations thereof, or the like. In another embodiment, the first and second enclosure layers 900, 1000 may be sealed along three sides of sealing edge $S_1$ creating a pocket therein. In such embodiment, the battery assembly 400 may be placed within the pocket, and the final edge of sealing edge $S_1$ is subsequently sealed. In one embodiment, the sealing edge $S_1$ is sealed using a hot press, that applies a controlled temperature and pressure to the sealing edge $S_1$ causing the first and second enclosure layers 900, 1000 to adhere or fuse together along sealing edge $S_1$. In another embodiment, a vacuum is applied to the battery assembly 400 during the sealing process to evacuate any excess volume occupied by air or other gas. The time for which the sealing edge is subject to the hot press may be controlled and is dependent upon the materials selected for the first and second enclosure layers 900, 1000. Once sealed over battery assembly 400, the sealed first and second enclosure layers 900, 1000 form battery package 1100. Upon sealing, battery package 1100 is liquid tight and/or air tight, depending on the desired application. The terminals 905, 907 remain exposed, and are not covered by battery package 1100 to allow a user to connect the terminals to a device to be powered, or to a battery charger.

Methods of the present disclosure (e.g., method 1200 shown in FIG. 12) are described with reference to FIGS. 1-12. Initially, at 1202, a battery assembly, such as battery assembly 400 is provided, including a prepared electrode assembly 401. At 1204, a constraint, such as constraint 316 is provided over the electrode assembly 401, as described herein above. At 1206, a bus bar 410 is coupled through current collector tabs 420 and secured thereto, for example via welding or the like, so that the electrode assembly 401 is electrically connected to the bus bar 410 and current collector tabs 420. To facilitate a reduction or elimination of the possibility that the abuse conditions may cause a failed weld, a reinforcement structure 590 may be utilized in some embodiments. In this embodiment, the reinforcement structure 590 is applied at 1208 to the battery assembly 400, such as over the current collectors 420 after having been electrically connected to bus bar 410. In one embodiment, the height $DSR_H$ is applied to be equal to a height BAH of the battery assembly 400 as measured in the Z-axis direction. In this embodiment, the reinforcement structure 590 is applied such that it has a height $DSR_H$ that spans over first margin 415, second margin 417 and the collector tabs 420. In one embodiment, the reinforcement structure 590 is prepared, such as by cutting or laser machining, to include a bus bar cutout 560 that defines an opening by which a portion of the bus bar 410 is exposed and may be folded from the Y-Z plane to the X-Z plane.

In another embodiment of the method 1200, at 1208, and as illustrated in FIG. 6, the reinforcement structure 590 is applied such that it has a height $DSR_H$ substantially equivalent to the collector tab height $CT_H$, and extends along a Y-axis extent of the electrode sub-units 402, but leaves the folded end portion 611 of the bus bar 410 exposed.

In one suitable embodiment of the method 1200, at 1208, the method 1200 includes applying the reinforcement structure 590 as a polymer film. In this embodiment, the polymer film is adhered to the battery assembly 400 using a hot melt technique. In one embodiment, the polymer film is heated directly, and the battery assembly 400 may be heated due to heat conducted from the polymer to the battery assembly 400. By applying sufficient heat to the polymer material, the material reflows into any gaps and around edges of the collector tabs 420 and bus bar 410. In one embodiment of the method 1200, the polymer film is heat treated after it has been applied to the desired portion of the battery assembly 400, as described herein. In this embodiment, the polymer film is heat treated to a temperature within a range of from 80° C. to 130° C., such as 80° C., 85° C., 90° C., 95° C., 100° C., 105° C., 110° C., 115° C., 120° C., 125° C. and 130° C. In one embodiment, when heated to this temperature range in this embodiment of the method, the polymer cross-links and significantly hardens to a rigid structure, thus forming the reinforcement structure 590. In other embodiments of the method 1200, when heated to the above-described temperature range, the polymer adheres to the battery assembly 400, but retains its flexibility or semi-flexible properties. In one embodiment of the method 1200, the reinforcement structure 590 is manufactured to have a length $DSR_L$ measured in the X-axis direction of from 25 µm to 500 µm, such as 25 µm, 50 µm, 75 µm, 100 µm, 125 µm, 150 µm, 175 µm, 200 µm, 225 µm, 250 µm, 275 µm, 300 µm, 325 µm, 350 µm, 375 µm, 400 µm, 425 µm, 450 µm, 475 µm or 500 µm. In one embodiment of the method 1200, the film forming the reinforcement structure is applied and has from a 15% to 40% reduction in length $DSR_L$ after heat treatment.

In one embodiment of the method 1200, subsequent to the application of the reinforcement structure 590, the battery assembly 400 is placed at 1210 within a battery package 1100 to form a complete battery 1160. In embodiments, the battery package 1100 comprises a first enclosure layer 900 and a second enclosure layer 1000. Each of the first and second enclosure layers may comprise a flexible or semi-flexible material, such as aluminum, polymer or the like. In one embodiment of the method 1200, one or more of the first and second enclosure layers 900, 1000 comprises a multi-layer aluminum polymer material, plastic, or the like. In one embodiment of the method 1200, one or more of first enclosure layer 900 and a second enclosure layer 1000 comprise a polymer material laminated on a metal substrate, such as aluminum.

In the embodiment of the method 1200, the battery assembly 400 is placed at 1210 on the first enclosure layer 900, such that a lower face $F_6$ of constraint 416 is in contact with the first enclosure layer 900. In one embodiment of the method 1200, the battery assembly 400 is placed within a recess 902 formed within the first enclosure layer 900. The recess 902 is sized and shaped to match the outer surface size and shape of the battery assembly 400. In one embodiment of the method 1200, second enclosure layer 1000 (FIG. 10) is placed over battery assembly 400, such that major face $F_5$ of constraint 416 is in contact with second enclosure layer 1000. The second enclosure layer 1000 is positioned (such as by movement in the placement direction $P_1$) to cover the entirety of the major face $F_5$ and recess 902. The enclosure is posited such that conductive terminals 905 and 907 remain uncovered by first and second enclosure layers 900, 1000.

In one embodiment of the method 1200, after proper placement of the second enclosure layer 1000, the first and second enclosure layers 900, 1000 are sealed along sealing edge $S_1$ (denoted by the dotted line in FIG. 11). In one embodiment of the method 1200, excess material of first and second enclosure layers 900, 1000 is trimmed, but mechanical cutting, laser cutting or the like, prior to, or subsequently to, sealing operation. The first and second enclosure layers 900, 1000 may be sealed along sealing edge $S_1$ by welding, heat sealing, adhesive, combinations thereof, or the like. In another embodiment, the first and second enclosure layers 900, 1000 may be sealed along three sides of sealing edge $S_1$ creating a pocket therein. In such embodiment, the battery assembly 400 may be placed within the pocket, and the final edge of sealing edge $S_1$ is subsequently sealed. In one embodiment of the method 1200, the sealing edge $S_1$ is sealed using a hot press, by applying a controlled temperature and pressure to the sealing edge $S_1$ causing the first and second enclosure layers 900, 1000 to adhere or fuse together along sealing edge $S_1$. In another embodiment of the method, a vacuum is applied to the battery assembly 400 during the sealing process to evacuate any excess volume occupied by air or other gas. The time for which the sealing edge is subject to the hot press may be controlled and is dependent upon the materials selected for the first and second enclosure layers 900, 1000. Once sealed over battery assembly 400, the sealed first and second enclosure layers 900, 1000 form battery package 1100. Upon sealing, battery package 1100 is liquid tight and/or airtight, depending on the desired application. The terminals 905, 907 remain exposed, and are not covered by battery package 1100 to allow a user to connect the terminals to a device to be powered, or to a battery charger.

The following embodiments are provided to illustrate aspects of the disclosure, although the embodiments are not intended to be limiting and other aspects and/or embodiments may also be provided.

Embodiment 1. A secondary battery assembly, comprising: an electrode assembly having mutually perpendicular transverse, longitudinal, and vertical axes corresponding to the X, Y and Z axes, respectively, of a three-dimensional Cartesian coordinate system, the electrode assembly defining a population of faces, each face defined by two of the transverse, longitudinal, and vertical axes; a population of first current collector tabs electrically coupled to a first bus bar extending along a first face of the electrode assembly, the first face extending in at least one of a Z-X plane defined by the Z and X axes or a Z-Y plane defined by the Z and Y axes; and a reinforcement structure disposed over at least a portion of the first current collector tabs, the first current collector tabs extending along the first face, the reinforcement structure comprising a polymer.

Embodiment 2. The secondary battery assembly of Embodiment 1, wherein the electrode assembly comprises a rectangular prismatic shape.

Embodiment 3. The secondary battery assembly of any prior Embodiment, wherein the electrode assembly is enclosed within a volume defined by a constraint.

Embodiment 4. The secondary battery assembly any prior Embodiment, further comprising a population of second current collector tabs electrically coupled to a second bus bar disposed along a second face of the population of faces, the second face being parallel or orthogonal to the first face.

Embodiment 5. The secondary battery assembly of any prior embodiment, wherein the reinforcement structure is disposed over each of the first bus bar and the second bus bar.

Embodiment 6. The secondary battery assembly of any prior embodiment, wherein the reinforcement structure comprises a polymer.

Embodiment 7. The secondary battery assembly of any prior embodiment, wherein the electrode assembly comprises a rectangular prismatic shape having at least four equal faces.

Embodiment 8. The secondary battery assembly of any prior embodiment, wherein each of the first current collector tabs comprises an opening and the bus bar is disposed through each opening of the first current collector tabs.

Embodiment 9. The secondary battery assembly of any prior embodiment, wherein the reinforcement structure is configured to extend into each opening of the first current collector tabs.

Embodiment 10. The secondary battery assembly of any prior embodiment, wherein the reinforcement structure comprises a rigid cross-linked polymer structure.

Embodiment 11. The secondary battery assembly of any prior embodiment, wherein the reinforcement structure comprises a notch for exposing a portion of the first bus bar.

Embodiment 12. The secondary battery assembly of any prior embodiment, wherein the reinforcement structure comprises a polymer configured to adhere to the first current collector tabs upon application of heat.

Embodiment 13. The secondary battery assembly of any prior embodiment, wherein the reinforcement structure is heat staked to the electrode assembly.

Embodiment 14. The secondary battery assembly of any prior embodiment, wherein the electrode assembly comprises a first margin and a second margin adjacent to the population of first current collector tabs, and wherein the reinforcement structure is disposed over each of the first margin, the second margin and the first current collector tabs.

Embodiment 15. The secondary battery assembly of any prior embodiment, wherein the electrode assembly comprises a first margin and a second margin adjacent to the population of first current collector tabs, and wherein the reinforcement structure is disposed over the first current collector tabs, but not over each of the first margin, the second margin.

Embodiment 16. The secondary battery assembly of any prior embodiment, further comprising an enclosure enclosing the electrode assembly and the reinforcement structure.

Embodiment 17. The secondary battery assembly of any prior embodiment, wherein the enclosure is at least one of liquid tight or air tight.

Embodiment 18. The secondary battery assembly of any prior embodiment, wherein each of the first current collector tabs are welded to the first bus bar.

Embodiment 19. The secondary battery assembly of any prior embodiment, wherein the reinforcement structure has a height, measured perpendicularly to the first face of from 25 μm to 500 μm.

Embodiment 20. A secondary battery comprising: an electrode assembly having mutually perpendicular transverse, longitudinal, and vertical axes corresponding to the X, Y and Z axes, respectively, of a three-dimensional Cartesian coordinate system, the electrode assembly defining a population of faces, each face defined by two of the transverse, longitudinal, and vertical axes; a population of first current collector tabs electrically coupled to a first bus bar extending along a first face of the electrode assembly, the first face extending in one of a Z-X plane defined by the Z and X axes or a Z-Y plane defined by the Z and Y axes; a reinforcement structure disposed over at least a portion of the first current collector tabs, the first current collector tabs extending along the first face, the reinforcement structure comprising a polymer; and a battery enclosure enclosing the electrode assembly and the reinforcement structure.

Embodiment 21. The secondary battery according to claim 20, further comprising a constraint defining a volume, the constraint disposed on an outer surface of the electrode assembly and the electrode assembly is contained within the volume.

Embodiment 22. The secondary battery assembly of claim 20, further comprising a population of second current collector tabs electrically coupled to a second bus bar disposed along a second face of the population of faces, the second face being parallel or orthogonal to the first face, and a second reinforcement structure disposed over at least a portion of the second current collector tabs.

Embodiment 23. The secondary battery assembly of any prior embodiment, wherein the constraint comprises a first primary growth constraint in contact with a surface of an electrode or counter electrode of the electrode assembly.

Embodiment 24. The secondary battery assembly of any prior embodiment, further comprising a population of second current collector tabs electrically coupled to a second bus bar disposed along a second one of the population of faces.

Embodiment 25. The secondary battery assembly of any prior embodiment, wherein the reinforcement structure is disposed over each of the first bus bar and the second bus bar.

Embodiment 26. The secondary battery assembly of any prior embodiment, wherein the reinforcement structure comprises a polymer.

Embodiment 27. The secondary battery assembly of any prior embodiment, wherein the electrode assembly comprises a rectangular prismatic shape.

Embodiment 28. The secondary battery assembly of any prior embodiment, wherein each of the first current collector tabs comprises an opening and the bus bar is disposed through each opening of the first current collector tabs.

Embodiment 29. The secondary battery assembly of any prior embodiment, wherein the reinforcement structure is configured to extend into each opening of the first current collector tabs.

Embodiment 30. The secondary battery assembly of any prior embodiment, wherein the reinforcement structure comprises a rigid cross-linked polymer structure.

Embodiment 31. The secondary battery assembly of any prior embodiment, wherein the reinforcement structure comprises a notch for exposing a portion of the first bus bar.

Embodiment 32. The secondary battery assembly of any prior embodiment, wherein the reinforcement structure comprises a polymer configured to adhere to the first current collector tabs upon application of heat.

Embodiment 33. The secondary battery assembly of any prior embodiment, wherein the reinforcement structure is heat staked to the electrode assembly.

Embodiment 34. The secondary battery assembly of any prior embodiment, wherein the electrode assembly comprises a first margin and a second margin adjacent to the population of first current collector tabs, and wherein the reinforcement structure is disposed over each of the first margin, the second margin and the first current collector tabs.

Embodiment 35. The secondary battery assembly of any prior embodiment, wherein the electrode assembly comprises a first margin and a second margin adjacent to the population of first current collector tabs, and wherein the reinforcement structure is disposed over the first current collector tabs, but not over each of the first margin, the second margin.

Embodiment 36. The secondary battery assembly of any prior embodiment, further comprising a packaging enclosing the electrode assembly and the reinforcement structure.

Embodiment 37. The secondary battery assembly of any prior embodiment, wherein the packaging is at least one of liquid tight or air tight.

Embodiment 38. The secondary battery assembly of any prior embodiment, wherein each of the first current collector tabs are welded to the first bus bar.

Embodiment 39. The secondary battery assembly of any prior embodiment, wherein the reinforcement structure has a height, measured perpendicularly to the first face of from 25 μm to 500 μm.

Embodiment 40. The secondary battery assembly of any prior embodiment, wherein the battery enclosure comprises aluminum.

Embodiment 41. The secondary battery assembly of any prior embodiment, wherein a height of the reinforcement structure is substantially equal to a height of the electrode assembly.

Embodiment 42. The secondary battery assembly of any prior embodiment, wherein the electrode assembly comprises an anodically active material selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide, $ZnCo_2O_4$; (f) particles of graphite and carbon; (g) lithium metal; and (h) combinations thereof.

Embodiment 43. The secondary battery assembly of any prior embodiment, wherein the electrode assembly comprises an anodically active material selected from the group consisting of silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd).

Embodiment 44. The secondary battery assembly of any prior embodiment, wherein the electrode assembly comprises an anodically active material selected from the group consisting of alloys and intermetallic compounds of Si, Ge, Sn, Pb, Sb, Bi, Zn, Al, Ti, Ni, Co, or Cd with other elements.

Embodiment 45. The secondary battery assembly of any prior embodiment, wherein the electrode assembly comprises an anodically active material selected from the group consisting of oxides, carbides, nitrides, sulfides, phosphides, selenides, and tellurides of Si, Ge, Sn, Pb, Sb, Bi, Zn, Al, Ti, Fe, Ni, Co, V, and Cd.

Embodiment 46. The secondary battery assembly of any prior embodiment, wherein the electrode assembly comprises an anodically active material selected from the group consisting of oxides, carbides, nitrides, sulfides, phosphides, selenides, and tellurides of Si.

Embodiment 47. The secondary battery assembly of any prior embodiment, wherein the electrode assembly comprises an anodically active material selected from the group consisting of silicon and the oxides and carbides of silicon.

Embodiment 48. The secondary battery assembly of any prior embodiment, wherein the electrode assembly comprises an anodically active material comprising lithium metal.

Embodiment 49. The secondary battery assembly of any prior embodiment, wherein the electrode assembly comprises an anodically active material selected from the group consisting of graphite and carbon.

Embodiment 50. The secondary battery assembly of any prior embodiment, wherein within the enclosure the secondary battery further comprises a non-aqueous, organic electrolyte.

Embodiment 51. The secondary battery assembly of any prior embodiment, wherein within the enclosure the secondary battery further comprises a non-aqueous electrolyte comprising a mixture of a lithium salt and an organic solvent.

Embodiment 52. The secondary battery assembly of any prior embodiment, wherein within the enclosure the secondary battery further comprises a polymer electrolyte.

Embodiment 53. The secondary battery assembly of any prior embodiment, wherein within the enclosure the secondary battery further comprises a solid electrolyte.

Embodiment 54. The secondary battery assembly of any prior embodiment, wherein within the enclosure the secondary battery further comprises a solid electrolyte selected from the group consisting of sulfide-based electrolytes.

Embodiment 55. The secondary battery assembly of any prior embodiment, wherein within the enclosure the secondary battery further comprises a solid electrolyte selected from the group consisting of lithium tin phosphorus sulfide ($Li_{10}SnP_2S_{12}$), lithium phosphorus sulfide ($\beta$-$Li_3PS_4$) and lithium phosphorus sulfur chloride iodide ($Li_6PS_5Cl_{0.9}I_{0.1}$).

Embodiment 56. The secondary battery assembly of any prior embodiment, wherein within the enclosure the secondary battery further comprises a polymer-based electrolyte.

Embodiment 57. The secondary battery assembly of any prior embodiment, wherein within the enclosure the secondary battery further comprises a polymer electrolyte selected from the group consisting of PEO-based polymer electrolyte, polymer-ceramic composite electrolyte (solid), polymer-ceramic composite electrolyte, and polymer-ceramic composite electrolyte.

Embodiment 58. The secondary battery assembly of any prior embodiment, wherein within the enclosure the secondary battery further comprises a solid electrolyte selected from the group consisting of oxide-based electrolytes.

Embodiment 59. The secondary battery assembly of any prior embodiment, wherein within the enclosure the secondary battery further comprises a solid electrolyte selected from the group consisting of lithium lanthanum titanate ($Li_{0.34}La_{0.56}TiO_3$), Al-doped lithium lanthanum zirconate ($Li_{6.24}La_3Zr_2Al_{0.24}O_{11.98}$), Ta-doped lithium lanthanum zirconate ($Li_{6.4}La_3Zr_{1.4}Ta_{0.6}O_{12}$) and lithium aluminum titanium phosphate ($Li_{1.4}Al_{0.4}Ti_{1.6}(PO_4)_3$).

Embodiment 60. The secondary battery assembly of any prior embodiment, wherein one of electrode active material and counter-electrode material of the electrode assembly is a cathodically active material selected from the group consisting of intercalation chemistry positive electrodes and conversion chemistry positive electrodes.

Embodiment 61. The secondary battery assembly of any prior embodiment, wherein one of electrode active material and counter-electrode material of the electrode assembly is a cathodically active material comprising an intercalation chemistry positive electrode material.

Embodiment 62. The secondary battery assembly of any prior embodiment, wherein one of electrode active material and counter-electrode material of the electrode assembly is a cathodically active material comprising a conversion chemistry positive electrode active material.

Embodiment 63. The secondary battery assembly of any prior embodiment, wherein one of electrode active material and counter-electrode material of the electrode assembly is a cathodically active material selected from the group consisting of S (or $Li_2S$ in the lithiated state), LiF, Fe, Cu, Ni, $FeF_2$, $FeO_dF_{3-2d}$, $FeF_3$, $CoF_3$, $CoF_2$, $CuF_2$, $NiF_2$, where $0 \leq d \leq 0.5$.

Embodiment 64. A method of manufacturing a secondary battery, comprising: preparing an electrode assembly having mutually perpendicular transverse, longitudinal, and vertical axes corresponding to the X, Y and Z axes, respectively, of a three-dimensional Cartesian coordinate system, the electrode assembly defining a population of faces, each face defined by two of the transverse, longitudinal, and vertical axes; electrically coupling a population of first current collector tabs to a first bus bar extending along a first face of the electrode assembly; adhering a reinforcement structure over at least a portion of the first current collector tabs, the reinforcement structure comprising a polymer; enclosing the electrode assembly and the reinforcement structure within a battery enclosure, such that the reinforcement structure is between the battery enclosure and the electrode assembly; and vacuum sealing the enclosure.

Embodiment 65. A method of preparing a battery assembly for use with a secondary battery, the method comprising: preparing an electrode assembly having mutually perpendicular transverse, longitudinal, and vertical axes corresponding to the X, Y and Z axes, respectively, of a three-dimensional Cartesian coordinate system, the electrode assembly defining a population of faces, each face defined by two of the transverse, longitudinal, and vertical axes; electrically coupling a population of first current collector tabs to a first bus bar extending along a first face of the electrode assembly; adhering a reinforcement structure over at least a portion of the first current collector tabs, the reinforcement structure comprising a polymer; and enclosing the electrode assembly and the reinforcement structure within a battery enclosure.

Embodiment 66. The method according to Embodiment 65, wherein the adhering comprises applying heat and pressure to the reinforcement structure.

Embodiment 67. The method according to any prior Embodiment, wherein the adhering comprises at least partially filling openings in the first current collector tabs with the reinforcement structure.

Embodiment 68. The method according to any prior Embodiment, wherein the reinforcement structure extends across an entirety of the first current collector tabs.

Embodiment 69. An electrode assembly for cycling between a charged state and a discharged state, the electrode assembly comprising a population of unit cells, an electrode bus bar, and a counter-electrode bus bar, wherein the members of the unit cell population comprise an electrode structure, a separator structure, and a counter-electrode structure, wherein (a) the electrode structures comprise an electrode active material layer, an electrode current collector having a tab, and an electrode tab reinforcement structure comprising a first polymer disposed over at least a portion of the electrode current collector tab, and (b) the counter-electrode current collectors comprise a counter-electrode active material layer, a counter-electrode current collector having a tab, and a counter-electrode tab reinforcement structure comprising a second polymer disposed over at least a portion of the counter-electrode current collector tab, and the electrode structures are electrically connected, in parallel, to the electrode bus bar via the electrode current collector tabs and the counter-electrode structures are electrically connected, in parallel, to the counter-electrode bus bar via the counter-electrode current collector tabs.

Embodiment 70. The electrode assembly of Embodiment 69 wherein the first and second polymers are the same polymer.

Embodiment 71. The electrode assembly of any prior Embodiment wherein the electrode assembly has mutually perpendicular transverse, longitudinal and vertical axes corresponding to the x, y and z axes, respectively, of a three-dimensional Cartesian coordinate system, a first longitudinal end surface and a second longitudinal end surface separated from each other in the longitudinal direction, and a lateral surface surrounding an electrode assembly longitudinal axis $A_{EA}$ and connecting the first and second longitudinal end surfaces, the population of unit cells being stacked in series in the longitudinal direction.

Embodiment 72. The electrode assembly of any previous Embodiment wherein the electrode assembly is polyhedral.

Embodiment 73. The electrode assembly of any previous Embodiment wherein the electrode assembly has a prismatic shape.

Embodiment 74. The electrode assembly of any previous Embodiment wherein the electrode assembly has mutually perpendicular transverse, longitudinal and vertical axes corresponding to the x, y and z axes, respectively, of a three-dimensional Cartesian coordinate system, and the electrode assembly is enclosed within a volume defined by a constraint system comprising (i) first and second primary growth constraints separated in the longitudinal direction, and (ii) first and second secondary growth constraints separated in the vertical direction and connecting the first and second primary growth constraints, wherein (iii) the first secondary growth constraint is further connected to the upper end surfaces of the electrode or counter-electrode structures of a subset of the unit cell population, and (iv) the second secondary growth constraint is further connected to the lower end surfaces of the electrode or counter-electrode structures of a subset of the unit cell population.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A secondary battery assembly, comprising:
an electrode assembly having mutually perpendicular transverse, longitudinal, and vertical axes corresponding to an X axis, a Y axis, and a Z axis, respectively, of a three-dimensional Cartesian coordinate system, the electrode assembly defining a population of faces, each face defined by two of the transverse, longitudinal, and vertical axes, the population of faces comprising a first face;
a population of first current collector tabs electrically coupled to a first bus bar, the population of the first current collector tabs extends in a first direction perpendicular to the first face of the electrode assembly, the first face being at least one of (a) a Z-X plane defined by the Z axis and by the X axis and (b) a Z-Y plane defined by the Z axis and the Y axis, each of the population of the first current collector tabs having a hole sized and shaped to allow the first bus bar to pass therethrough, the electrode assembly comprising the first current collector tabs; and
a plurality of portions of the first bus bar extending in a second direction along the first face of the electrode assembly, the second direction being perpendicular to the first direction, the plurality of portions of the first bus bar passing through the hole of each of the population of the first current collector tabs, the passing being in the second direction; and a reinforcement structure disposed completely over each first current collector tab in at least a subset of the population of the population of the first current collector tabs, the reinforcement structure comprising a polymer, wherein each of the first current collector tabs in the population of the first current collector tabs, is located below a first surface of the reinforcement structure, the first surface being parallel to the first face of the electrode assembly.

2. The secondary battery assembly of claim 1, wherein the electrode assembly comprises a prismatic shape.

3. The secondary battery assembly of claim 2, wherein the electrode assembly is enclosed within a volume defined by a constraint, and the constraint comprises a first primary growth constraint in contact (a) with a surface of an electrode or (b) with a surface of a counter electrode, of the electrode assembly.

4. The secondary battery assembly of claim 1, further comprising a population of second current collector tabs electrically coupled with a second bus bar disposed along a second face of the population of faces, the second face being parallel or orthogonal to the first face.

5. The secondary battery assembly of claim 4, wherein the reinforcement structure is disposed over the first bus bar and the second bus bar.

6. The secondary battery assembly of claim 1, wherein the reinforcement structure comprises polyvinylidene fluoride (PVDF), polyethylene (PE), ethylene acrylic acid (EAA), ethylene methacrylic acid (EMAA), any of their functional derivatives, any copolymer thereof, or any combinations thereof.

7. The secondary battery assembly of claim 1, wherein the reinforcement structure is configured to extend at least partially into the hole of each of the population of the first current collector tabs.

8. The secondary battery assembly of claim 1, wherein the reinforcement structure comprises a heat treated polymer structure.

9. The secondary battery assembly of claim 1, wherein the reinforcement structure comprises a notch for exposing a portion of the first bus bar.

10. The secondary battery assembly of claim 1, wherein the reinforcement structure comprises a polymer configured to adhere to the population of the first current collector tabs upon application of heat.

11. The secondary battery assembly of claim 1, wherein the reinforcement structure is configured to adhere to the electrode assembly at least in part by using heat.

12. The secondary battery assembly of claim 1, wherein the electrode assembly comprises a first margin adjacent to the population of first current collector tabs and a second margin adjacent to the population of first current collector tabs, and wherein the reinforcement structure is disposed over each of (a) the first margin, (b) the second margin and (c) the population of the first current collector tabs.

13. The secondary battery assembly of claim 1, wherein the electrode assembly comprises a first margin adjacent to the population of first current collector tabs and a second margin adjacent to the population of first current collector tabs, and wherein the reinforcement structure is disposed over the population of the first current collector tabs, and not over each of (a) the first margin and (b) the second margin.

14. The secondary battery assembly of claim 1, further comprising an enclosure enclosing (a) the electrode assembly and (b) the reinforcement structure.

15. The secondary battery assembly of claim 14, wherein the enclosure is (i) liquid tight, (ii) air tight, or (iii) liquid and air tight.

16. The secondary battery assembly of claim 1, wherein each member of the population of the first current collector tabs is welded to the first bus bar.

17. The secondary battery assembly of claim 1, wherein the reinforcement structure has a height, measured perpendicularly to the first face, the height being from 25 µm to 500 µm.

18. The secondary battery assembly of claim 1, wherein no portion of any current collector tab in the population of the population of the first current collector tabs, penetrates the reinforcement structure and crosses the reinforcement structure.

19. The secondary battery assembly of claim 1, wherein the electrode assembly comprises an anode active material including a composite material, the anode active material comprising silicon, hard carbon, soft carbon, or a carbon nanotubes.

20. A method of preparing a battery assembly for use with a secondary battery, the method comprising: manufacturing the secondary battery assembly of claim 1.

21. The method according to claim 20, wherein the manufacturing comprises applying heat and pressure to the reinforcement structure.

22. The method according to claim 20, wherein the manufacturing comprises at least partially filling the hole in each of the population of the first current collector tabs with the reinforcement structure.

23. The method according to claim 20, further comprising extending the reinforcement structure across the population of the first current collector tabs.

24. A secondary battery comprising:
an electrode assembly having mutually perpendicular transverse, longitudinal, and vertical axes corresponding to an X axis, a Y axis, and a Z axis, respectively, of a three-dimensional Cartesian coordinate system, the electrode assembly defining a population of faces, each face defined by two of the transverse, longitudinal, and vertical axes, the population of faces comprising a first face;
a population of first current collector tabs electrically coupled to a first bus bar, wherein: the population of the first current collector tabs extends in a first direction perpendicular to the first face of the electrode assembly, the first face being at least one of (a) a Z-X plane defined by the Z and X axes and (b) a Z-Y plane defined by the Z and Y axes, each member of the population of the first current collector tabs having a hole sized and shaped to allow the first bus bar to pass therethrough; and
a plurality of portions of the first bus bar extends in a second direction along the first face of the electrode assembly, wherein:
the second direction is perpendicular to the first direction; and
the plurality of portions of the first bus bar pass in the second direction through the hole of each of the population of the first current collector tabs;
a reinforcement structure disposed completely over each first current collector tab in at least a subset of the population of the population of the first current collector tabs, the reinforcement structure comprising a polymer; and
a battery enclosure enclosing the electrode assembly and the reinforcement structure, wherein each of the first current collector tabs in the population of the first current collector tabs, is located below a first surface of the reinforcement structure, the first surface being parallel to the first face of the electrode assembly.

25. The secondary battery according to claim 24, further comprising a constraint defining a volume, the constraint disposed on an outer surface of the electrode assembly, and the electrode assembly is contained within the volume.

26. The secondary battery according to claim 24, further comprising:
a population of second current collector tabs electrically coupled to a second bus bar, wherein the second bus bar extends along a second face of the population of faces, the second face being parallel or orthogonal to the first face; and
a second reinforcement structure disposed completely over each second current collector tab in at least a subset of the population of the population of the second current collector tabs.

27. The secondary battery according to claim 26, wherein the reinforcement structure is disposed over each of (a) the first bus bar and (b) the second bus bar.

28. The secondary battery according to claim 24, wherein the reinforcement structure comprises polyvinylidene fluoride (PVDF), polyethylene (PE), ethylene acrylic acid (EAA), ethylene methacrylic acid (EMAA), functional derivatives thereof, copolymers thereof, or combinations thereof.

29. A method of manufacturing a secondary battery, the method comprising: manufacturing the secondary battery of claim 24.

30. The method according to claim 29, wherein the manufacturing comprises applying heat and pressure to the reinforcement structure during the manufacturing.

31. The method according to claim 29, wherein the second battery assembly comprises an enclosure enclosing (a) the electrode assembly and (b) the reinforcement structure, the manufacturing comprises sealing the enclosure at least in part using vacuum.

* * * * *